US012576468B2

(12) United States Patent
Omata et al.

(10) Patent No.: US 12,576,468 B2
(45) Date of Patent: Mar. 17, 2026

(54) CYLINDER DEVICE AND METHOD OF MANUFACTURING PISTON ROD

(71) Applicant: Hitachi Astemo, Ltd., Ibaraki (JP)

(72) Inventors: Yasuhisa Omata, Hitachinaka (JP); Hideo Nagayama, Hitachinaka (JP); Kosuke Tokunaga, Hitachinaka (JP); Ryo Shinata, Hitachinaka (JP); Reiji Nakagawa, Hitachinaka (JP); Shoichiro Soeta, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 563 days.

(21) Appl. No.: 17/909,505

(22) PCT Filed: Mar. 11, 2021

(86) PCT No.: PCT/JP2021/009810
§ 371 (c)(1),
(2) Date: Sep. 6, 2022

(87) PCT Pub. No.: WO2021/193107
PCT Pub. Date: Sep. 30, 2021

(65) Prior Publication Data
US 2023/0116767 A1 Apr. 13, 2023

(30) Foreign Application Priority Data
Mar. 27, 2020 (JP) ................................. 2020-057547

(51) Int. Cl.
*B24B 21/02* (2006.01)
*F16F 9/32* (2006.01)

(52) U.S. Cl.
CPC ............ *B24B 21/02* (2013.01); *F16F 9/3221* (2013.01); *F16F 2226/02* (2013.01)

(58) Field of Classification Search
CPC ..... F16F 2226/02; F16F 9/3221; B24B 5/047; B24B 5/18; B24B 5/22; B24B 5/307; B24B 21/00; B24B 21/02; B24B 21/006
(Continued)

(56) References Cited

U.S. PATENT DOCUMENTS 5,842,911 A * 12/1998 Weber ....................... B24B 1/00
451/49
2003/0192501 A1 * 10/2003 Ishikawa ................... F02F 1/20
123/193.2
(Continued)

FOREIGN PATENT DOCUMENTS

JP 2003-286895 A 10/2003
JP 2011-137492 A 7/2011
(Continued)

OTHER PUBLICATIONS

International Search Report received in corresponding International Application No. PCT/JP2021/009810 dated May 18, 2021.
(Continued)

*Primary Examiner* — Robert A. Siconolfi
*Assistant Examiner* — San M Aung
(74) *Attorney, Agent, or Firm* — Mattingly & Malur, PC

(57) ABSTRACT
This cylinder device of the present aspect includes: a cylinder having a bottomed tubular shape; a seal member provided at an opening of the cylinder; and a piston rod that is provided to protrude from the opening of the cylinder and slides with respect to the seal member. A sliding surface of the piston rod has a chrome-plated layer. In the sliding surface, as characteristic evaluation parameters of a plateau structure surface described in JIS B 0671-2 and ISO 13565-2, a reduced valley depth Rvk is 0.06 μm or more and less than a plating thickness, a reduced peak height Rpk is 0 μm
(Continued)

ROUGHNESS CURVE
(μm) (LONGITUDINAL MAGNIFICATION: × 50, 000. 00 LATERAL MAGNIFICATION: × 50. 00)

or more and 0.04 μm or less, and a core roughness depth Rk is 0.08 μm or more and 0.16 μm or less.

9 Claims, 20 Drawing Sheets

(58) Field of Classification Search
USPC .................................................... 188/322.17
See application file for complete search history.

(56) References Cited

U.S. PATENT DOCUMENTS

| | | | | |
|---|---|---|---|---|
| 2004/0112695 A1* | 6/2004 | Niwa | ...................... | F16F 9/366 |
| | | | | 188/322.17 |
| 2011/0159788 A1 | 6/2011 | Asai et al. | | |
| 2015/0247222 A1* | 9/2015 | Obata | ...................... | C21D 1/62 |
| | | | | 148/595 |
| 2015/0369314 A1* | 12/2015 | Filip | ...................... | C23C 14/34 |
| | | | | 204/192.12 |
| 2019/0285136 A1* | 9/2019 | Ishibashi | ............. | F16F 15/3156 |
| 2020/0049099 A1* | 2/2020 | Kaneko | ..................... | F02F 1/20 |

FOREIGN PATENT DOCUMENTS

| | | |
|---|---|---|
| JP | 2014-62490 A | 4/2014 |
| JP | 2015-161016 A | 9/2015 |
| JP | 2018-84301 A | 5/2018 |
| WO | 2018/154716 A1 | 8/2018 |

OTHER PUBLICATIONS

Written Opinion received in corresponding International Application No. PCT/JP2021/009810 dated May 18, 2021.

* cited by examiner

FIG. 1
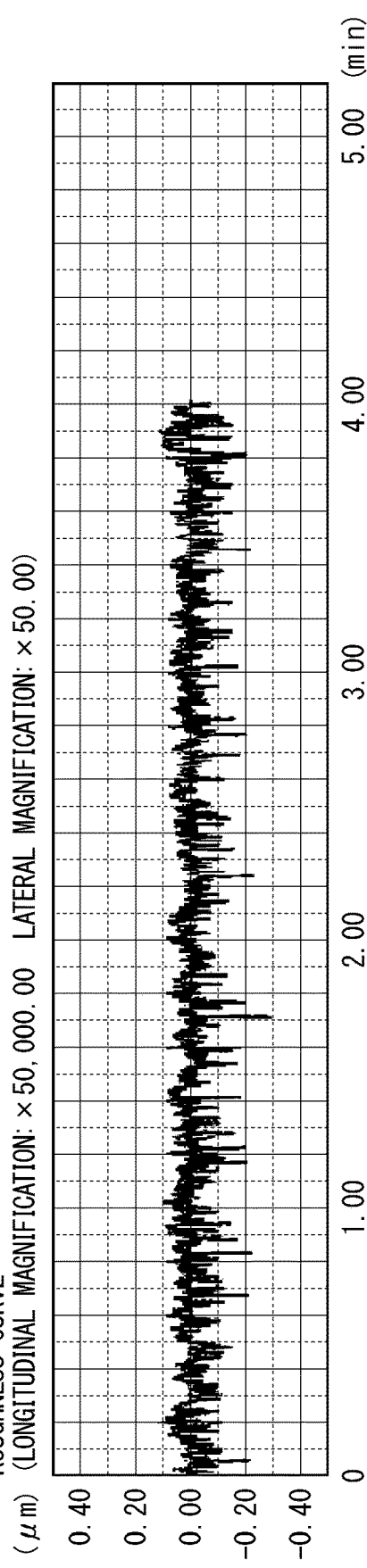

FIG. 4
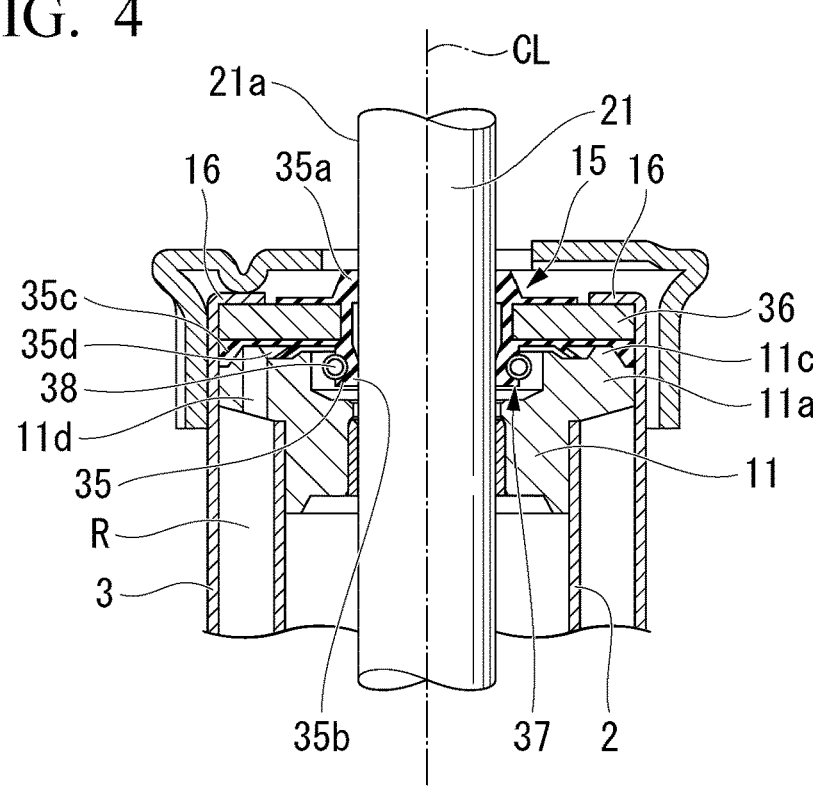
FIG. 5
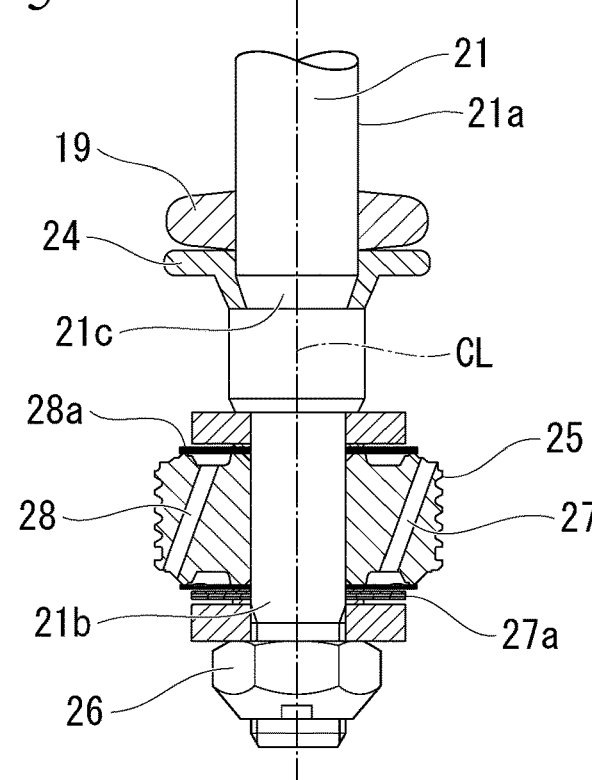

FIG. 6

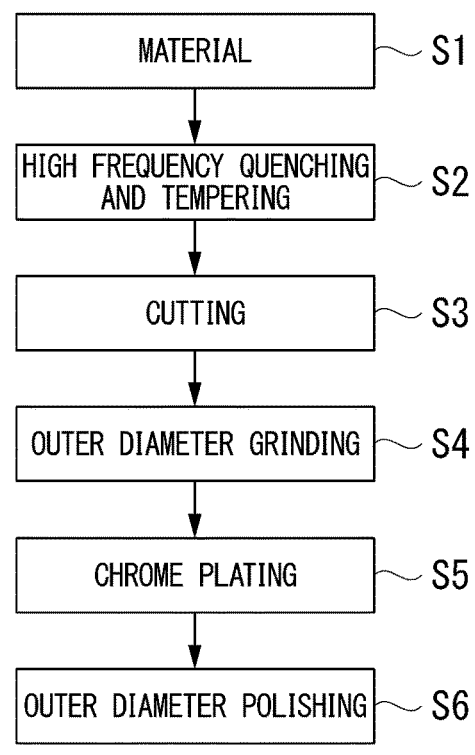

```
┌─────────────────────────┐
│        MATERIAL         │─── S1
└─────────────────────────┘
            │
            ▼
┌─────────────────────────┐
│ HIGH FREQUENCY QUENCHING│─── S2
│      AND TEMPERING      │
└─────────────────────────┘
            │
            ▼
┌─────────────────────────┐
│        CUTTING          │─── S3
└─────────────────────────┘
            │
            ▼
┌─────────────────────────┐
│ OUTER DIAMETER GRINDING │─── S4
└─────────────────────────┘
            │
            ▼
┌─────────────────────────┐
│     CHROME PLATING      │─── S5
└─────────────────────────┘
            │
            ▼
┌─────────────────────────┐
│ OUTER DIAMETER POLISHING│─── S6
└─────────────────────────┘
```

FIG. 7

```
              CHROME PLATING
                    │
                    ▼
S61 ── ┌─────────────────────────┐ ┐
       │        POLISHING        │ │
       └─────────────────────────┘ │
                    │              ├ POLISHING FOR FORMING OIL RESERVOIR. (S6-1)
                    ▼              │
S62 ── ┌─────────────────────────┐ │
       │       (POLISHING)       │ │
       └─────────────────────────┘ ┘
                    │
                    ▼
S63 ── ┌─────────────────────────┐ ┐
       │        POLISHING        │ │
       └─────────────────────────┘ │
                    │              ├ POLISHING FOR PLATEAU SURFACE (S6-2)
                    ▼              │
S64 ── ┌─────────────────────────┐ │
       │       (POLISHING)       │ │
       └─────────────────────────┘ ┘
                    │
                    ▼
               COMPLETE
```

LOAD LENGTH RATIO Mr (%)

FIG. 27

| COARSE | | ← ABRASIVE PARTICLE SIZE → | | | FINE |
|---|---|---|---|---|---|
| PARTICLE SIZE 1 | PARTICLE SIZE 2 | PARTICLE SIZE 3 | PARTICLE SIZE 4 | PARTICLE SIZE 5 | PARTICLE SIZE 6 |
| #320 | #400 | #600 | #800 | #1000 | #2000 |

FIG. 28

| SAMPLE NUMBER | POLISHING FOR FORMING OIL RESERVOIR | | POLISHING FOR FORMING PLATEAU SURFACE | | REDUCED PEAK HEIGHT Rpk ($\mu$m) | CORE ROUGHNESS DEPTH Rk ($\mu$m) | REDUCED VALLEY DEPTH Rvk ($\mu$m) |
|---|---|---|---|---|---|---|---|
| | FIRST POLISHING STEP | SECOND POLISHING STEP | THIRD POLISHING STEP | FOURTH POLISHING STEP | | | |
| SAMPLE 1 | PARTICLE SIZE 3 | PARTICLE SIZE 2 | PARTICLE SIZE 5 | PARTICLE SIZE 6 | 0.02 | 0.08 | 0.06 |
| SAMPLE 2 | PARTICLE SIZE 3 | PARTICLE SIZE 2 | PARTICLE SIZE 6 | – | 0.02 | 0.09 | 0.06 |
| SAMPLE 3 | PARTICLE SIZE 3 | PARTICLE SIZE 2 | PARTICLE SIZE 6 | PARTICLE SIZE 6 | 0.02 | 0.09 | 0.07 |
| SAMPLE 4 | PARTICLE SIZE 3 | PARTICLE SIZE 1 | PARTICLE SIZE 4 | PARTICLE SIZE 6 | 0.02 | 0.10 | 0.12 |
| SAMPLE 5 | PARTICLE SIZE 3 | PARTICLE SIZE 1 | PARTICLE SIZE 4 | PARTICLE SIZE 6 | 0.02 | 0.10 | 0.13 |
| SAMPLE 6 | PARTICLE SIZE 3 | PARTICLE SIZE 1 | PARTICLE SIZE 5 | PARTICLE SIZE 6 | 0.02 | 0.11 | 0.15 |
| SAMPLE 7 | PARTICLE SIZE 3 | PARTICLE SIZE 1 | PARTICLE SIZE 6 | PARTICLE SIZE 6 | 0.03 | 0.13 | 0.15 |
| SAMPLE 8 | PARTICLE SIZE 3 | – | – | – | 0.03 | 0.12 | 0.07 |
| SAMPLE 9 | PARTICLE SIZE 3 | PARTICLE SIZE 2 | – | – | 0.05 | 0.17 | 0.09 |
| SAMPLE 10 | PARTICLE SIZE 3 | PARTICLE SIZE 1 | – | – | 0.05 | 0.18 | 0.10 |

FIG. 29

SPEED (×10⁻³) [m/s]

| AMPLITUDE (×10⁻³) [m] | FREQUENCY [Hz] | | | | | | | | | |
|---|---|---|---|---|---|---|---|---|---|---|
| | 0.2 | 0.5 | 1 | 2 | 5 | 10 | 15 | 20 | 30 | 40 |
| 0.05 | 0.06 | 0.16 | 0.31 | 0.63 | 1.57 | 3.14 | 4.71 | 6.28 | 9.42 | 12.57 |
| 0.1 | 0.13 | 0.31 | 0.63 | 1.26 | 3.14 | 6.28 | 9.42 | 12.57 | 18.85 | 25.13 |
| 0.2 | 0.25 | 0.63 | 1.26 | 6.28 | 6.28 | 12.57 | 18.85 | 25.13 | 37.70 | 50.27 |
| 0.5 | 0.63 | 1.57 | 3.14 | 9.28 | 15.71 | 31.42 | 47.12 | 62.83 | 94.25 | 125.66 |
| 1.0 | 1.26 | 3.14 | 6.28 | 12.57 | 31.42 | 62.83 | 94.25 | 125.66 | 188.50 | 251.33 |
| 2.5 | 3.14 | 7.85 | 15.71 | 31.42 | 78.54 | 157.08 | 235.62 | 314.16 | 471.24 | 628.32 |

CYLINDER DEVICE AND METHOD OF MANUFACTURING PISTON ROD

TECHNICAL FIELD

The present invention relates to a cylinder device and a method of manufacturing a piston rod.

Priority is claimed on Japanese Patent Application No. 2020-057547, filed Mar. 27, 2020, the content of which is incorporated herein by reference.

BACKGROUND ART

In the related art, techniques for improving wear resistance and sliding characteristics by specifying surface properties of automobile-related sliding parts have been proposed. For example, in Patent Document 1 below, a technique for processing a reduced peak height Rpk to 0.09 μm or less and a reduced valley depth Rvk to 0.4 to 1.3 μm in a surface roughness by polishing a groove portion of a contact surface with an element in a pulley for a belt type continuously variable transmission using a wrap film is disclosed.

CITATION LIST

Patent Document

Patent Document 1
  Japanese Unexamined Patent Application, First Publication No. 2011-137492

SUMMARY OF INVENTION

Technical Problem

In relation to the surface properties of automobile-related sliding parts, studies regarding piston rods have been performed. That is, in a piston rod, from the viewpoint of sliding characteristics and corrosion resistance, a sliding surface with an oil seal is plated with chrome, and then polishing processing such as buffing or super-finishing is performed.

In the sliding surface of the piston rod with the oil seal, in a case where the reduced peak height of the sliding surface is high, aggression to the oil seal becomes strong, and the oil seal may be worn. Further, in a case where the reduced valley depth of the sliding surface of the piston rod is shallow, a thickness of an oil film may be insufficient. On the other hand, in a case where the reduced valley depth is deep, the reduced valley may be strongly caught by the oil seal.

Furthermore, according to the research by the present inventors, it was found that if a core roughness depth in the sliding surface of the piston rod is small, the familiarity from a dry state to a steady state is affected.

Here, in a case where the piston rod is a piston rod of a suspension device of an automobile, the core roughness depth is considered to affect the riding comfort of the automobile.

That is, if the surface properties of the sliding surface of the piston rod are inappropriate, the riding comfort of the automobile may deteriorate. Further, if the surface properties of the sliding surface of the piston rod are inappropriate, the sliding characteristics may change with time.

An object of the present invention is to provide a cylinder device and a method of manufacturing a piston rod in which it is possible to reduce the change in the sliding characteristics of the piston rod with time and it is possible to improve the familiarity from the dry state to the steady state by improving the wear resistance of the sliding surface of the piston rod.

Solution to Problem

The present invention has adopted each of the following aspects.

(1) A cylinder device including: a cylinder having a bottomed tubular shape; a seal member provided at an opening of the cylinder; and a piston rod that is provided to protrude from the opening of the cylinder and slides with respect to the seal member, wherein a sliding surface of the piston rod has a chrome-plated layer, and wherein, in the sliding surface, as characteristic evaluation parameters of a plateau structure surface described in JIS B 0671-2 and ISO 13565-2, a reduced valley depth Rvk is 0.06 μm or more and less than a plating thickness, a reduced peak height Rpk is 0 μm or more and 0.04 μm or less, and a core roughness depth Rk is 0.08 μm or more and 0.16 μm or less.

(2) A method of manufacturing a piston rod in which a chrome-plated layer is formed on a sliding surface, the method including: a polishing step performed after the formation of the chrome-plated layer, wherein the polishing step includes an initial polishing step of polishing with a first polishing film to obtain an initial polished surface in which, as a characteristic evaluation parameter of a plateau structure surface described in JIS B 0671-2 and ISO 13565-2, a reduced valley depth Rvk is 0.06 μm or more and less than a plating thickness of the chrome plating, and a finish polishing step of polishing the initial polished surface with a second polishing film having a finer mesh than the first polishing film to form a plateau surface in which, as lubricity parameters of the plateau structure surface, a reduced peak height Rpk is 0 μm or more and 0.04 μm or less, and a core roughness depth Rk is 0.08 μm or more and 0.16 μm or less.

(3) In the method of manufacturing a piston rod according to (2), the following is also possible: in the initial polishing step, the initial polished surface is formed with a polishing material having a coarse particle size of #600 or less as the first polishing film; and in the finish polishing step, the plateau surface is formed with a polishing material having a fine particle size of #800 or more as the second polishing film.

Advantageous Effects of the Invention

According to each of the above aspects of the present invention, the sliding surface of the piston rod has a suitable reduced valley depth, a suitable reduced peak height, and a suitable core roughness depth. Therefore, it is possible to have the excellent wear resistance, it is possible to lower the aggression against the oil seal, it is possible to reduce the wear of the oil seal, and it is possible to reduce the change in the sliding characteristics with time. Further, the familiarity from the dry state to the steady state is suitable, and thus, in a case where the present invention is applied to a piston rod for an automobile suspension device, it is possible to provide a suspension device which does not deteriorate the riding comfort of an automobile.

BRIEF DESCRIPTION OF DRAWINGS

FIG. 1 is a graph showing an example of a surface roughness curve of a sliding surface of a piston rod obtained by a method of manufacturing a piston rod according to an embodiment of the present invention.

FIG. 4 is a view showing a structure of an upper portion of the shock absorber and is an enlarged cross-sectional view of a portion A in FIG. 2.

FIG. 5 is a view showing a tip end portion of the piston rod and is an enlarged cross-sectional view of a portion B in FIG. 2.

FIG. 6 is a flowchart showing an example of a manufacturing process of the piston rod.

FIG. 7 is a flowchart showing an example of outer diameter polishing of the piston rod (a polishing step S6 in FIG. 6).

FIG. 13 is an explanatory diagram showing a relationship between a reduced peak height (Rpk), a core roughness depth (Rk), and a reduced valley depth (Rvk) in a smoothed roughness curve.

FIG. 17 is an explanatory diagram showing a state in which the surface roughness curve is divided into a reduced peak and a reduced valley by extending the straight line to $\Delta$Mr=0% and 100%.

FIG. 27 is a table showing polishing films used in a first polishing step to a fourth polishing step.

FIG. 28 is a table showing measurement results of a reduced valley depth, a reduced peak height, and a core roughness depth in each of samples 1 to 10.

FIG. 29 is a table showing vibration conditions.

DESCRIPTION OF EMBODIMENTS

Hereinafter, a cylinder device and a method of manufacturing a piston rod according to an embodiment of the present invention will be described.

The embodiment described below is specifically described in order to better understand the gist of the present invention and is not intended to limit the present invention unless otherwise specified. In addition, the drawings used for the description of the embodiment shown below are shown by appropriately changing the scale in order to allow each part to be easily seen. Further, a reference sign CL in FIGS. 2 to 5 and the following description indicates the center line of a cylinder device and a piston rod.

Figure 2:
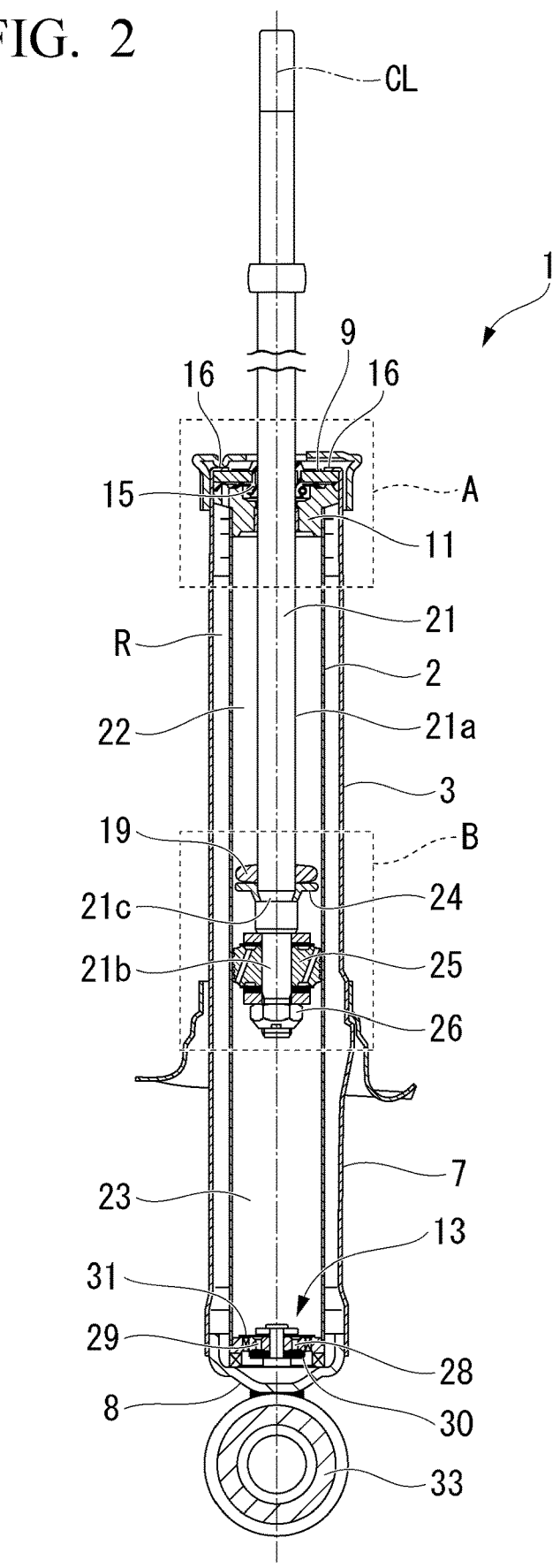
FIG. 2 is a view showing the entire structure of a shock absorber which is a cylinder device provided with the piston rod and is a cross-sectional view of a cross section including a central axis CL. The sliding surface of the piston rod has the characteristics of the surface roughness curve shown in FIG. 1.

FIG. 1 is a graph showing an example of a surface roughness curve of a sliding surface of a piston rod whose surface has been polished according to a manufacturing method that will be described later. Further, FIG. 2 is a view showing the entire structure of a shock absorber which is a cylinder device provided with the piston rod and is a cross-sectional view of a cross section including the central axis CL. This sliding surface of the piston rod has the characteristics of the surface roughness curve shown in FIG. 1.

Before explaining the surface roughness of the sliding surface of the piston rod, first, the entire configuration of the cylinder device including the piston rod will be described.

"Cylinder Device"

The cylinder device 1 shown in FIG. 2 is a shock absorber used for a suspension device of a vehicle such as an automobile or a railroad vehicle, and specifically, is used for a strut type suspension device of an automobile. This cylinder device 1 includes an inner tube (a cylinder) 2 having a cylindrical shape in which a working liquid is sealed and an outer tube 3 having a bottomed tubular shape which has a diameter larger than that of the inner tube 2, is provided on an outer peripheral side of the inner tube 2, and forms a reservoir chamber R with the inner tube 2 in which a working liquid and a working gas are sealed. That is, the cylinder device 1 is a double-tube type shock absorber in which the inner tube 2 is provided in the outer tube 3.

The outer tube 3 includes a cylindrical side wall portion 7 and a bottom portion 8 that closes one end side of the side wall portion 7 in an axial direction. The inner tube 2 has a cylindrical shape. The inner tube 2 is engaged with the bottom portion 8 of the outer tube 3 via an annular base valve 13 attached to one end thereof in the axial direction. Further, the inner tube 2 is engaged with an opening 9 on a side opposite to the bottom portion 8 of the side wall portion 7 of the outer tube 3 via an annular metal rod guide 11 attached to the other end thereof in the axial direction.

The base valve 13 is positioned in a radial direction by being placed on the bottom portion 8 of the outer tube 3 while fitted and fixed to the inner tube 2. As a result, the base valve 13 is disposed coaxially with the outer tube 3. The rod guide 11 is fitted to the inner tube 2 and the side wall portion 7 of the outer tube 3, and thus the other end portion of the inner tube 2 in the axial direction is disposed coaxially with the outer tube 3.

In this rod guide 11, an annular oil seal (a seal member) 15 is disposed on a side opposite to the bottom portion 8. The oil seal 15 is also fitted to an inner peripheral portion of the side wall portion 7 on a side of the opening 9. Since the opening 9 of the outer tube 3 is outside the inner tube 2 in the axial direction, it is also an opening of the cylinder. A locking portion 16 is formed on a side of the outer tube 3 opposite to the bottom portion 8 by being bent inward in the radial direction. The oil seal 15 is supported on one end side of the cylinder by being locked by the locking portion 16 on an outer side thereof in the axial direction.

A piston 25 is slidably fitted in the inner tube 2. The piston 25 defines the inside of the inner tube 2 into a first chamber 22 and a second chamber 23. The first chamber 22 is provided between the piston 25 in the inner tube 2 and the rod guide 11. The second chamber 23 is provided between the piston 25 in the inner tube 2 and the base valve 13. The second chamber 23 in the inner tube 2 is separated from a reservoir chamber R by the base valve 13 provided on one end side of the inner tube 2.

A metal piston rod 21 is connected to the piston 25 with a nut 26. The piston rod 21 has a cylindrical large diameter portion 21a having a constant outer diameter, passes through the rod guide 11 and the oil seal 15, and extends from one end side of the inner tube 2 and the outer tube 3, that is, the cylinder to the outside. The piston rod 21 is slidably inserted into the inside of each of the rod guide 11 and the oil seal 15 in the large diameter portion 21a. One end of the piston rod 21 is disposed inside the outer tube 3 and the inner tube 2, and the other end thereof is disposed outside the outer tube 3 and the inner tube 2.

A small diameter portion 21b is formed on one end side of the large diameter portion 21a of the piston rod 21. The piston 25 is inserted into the small diameter portion 21b, and the nut 26 is screwed into a screw portion formed on a tip end side of the small diameter portion 21b, and thus the piston 25 is attached to the piston rod 21. An annular groove 21c is formed in the large diameter portion 21a of the piston rod 21 at a position close to a base end portion of the small diameter portion 21b. A ring-shaped internal stopper 24 is mounted to be engaged with the annular groove 21c. A ring-shaped rebound rubber 19 is disposed on an upper side of the internal stopper 24.

Figure 3:
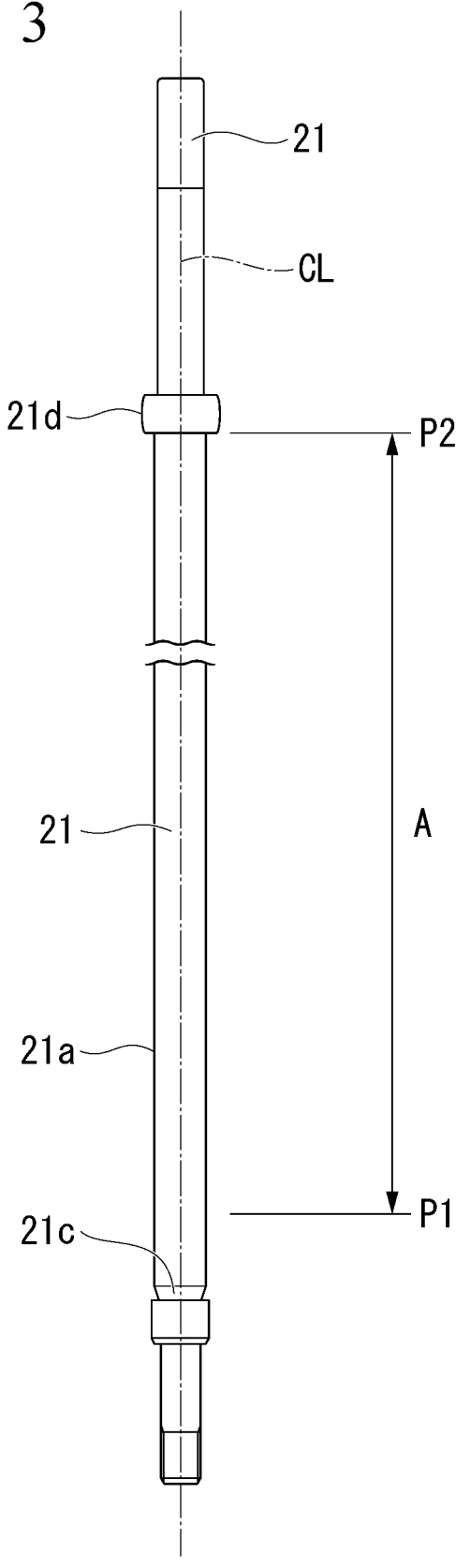
FIG. 3 is a front view showing an outer shape of the piston rod and a position of the sliding surface.

As shown in FIG. 3, in the large diameter portion 21a of the piston rod 21, a portion between a position P1 slightly separated from the annular groove 21c toward a side opposite to a piston mounting side and a connecting portion P2 of a bolt portion 21d serving as a mounting portion to a vehicle body is defined as a sliding range A with respect to the rod guide 11 and the oil seal 15.

Further, although omitted in the drawings, a chrome-plated layer is formed on an outer surface of the piston rod 21.

Further, in the piston rod 21, a surface of the sliding range A of the large diameter portion 21a (a sliding surface of the chrome-plated layer, which may hereinafter be simply referred to as a "sliding surface A") is a polished surface. In the polished surface, as characteristic evaluation parameters of a plateau structure surface described in JIS B 0671-2 and ISO 13565-2, a reduced peak height Rpk is 0 μm or more and 0.04 μm or less, a core roughness depth Rk is 0.08 μm or more and 0.16 μm or less, and a reduced valley depth Rvk is 0.06 μm or more and less than a plating thickness.

Details of this polished surface will be described later.

The piston rod 21 moves in the axial direction integrally with the piston 25. The oil seal 15 through which the large diameter portion 21a of the piston rod 21 is inserted closes a space between the outer tube 3 and the piston rod 21 to prevent the working liquid in the inner tube 2 and the working gas and working liquid in the reservoir chamber R from leaking to the outside.

As shown in FIG. 5, in the piston 25, a passage 27 and a passage 28 penetrating the piston 25 in the axial direction are formed. The passages 27 and 28 allow communication between the first chamber 22 and the second chamber 23. The piston 25 is provided with an annular disk valve 28a capable of closing the passage 28 by coming into contact with the piston 25 on a side opposite to the bottom portion 8 in the axial direction. Further, the piston 25 is provided with an annular disk valve 27a capable of closing the passage 27 by coming into contact with the piston 25 on a side of the bottom portion 8 in the axial direction.

When the piston rod 21 moves to a contraction side on which the entry amount into the inner tube 2 and the outer tube 3 is increased, the disk valve 28a moves in a direction in which the piston 25 shortens the second chamber 23. As a result, when the pressure in the second chamber 23 becomes higher than the pressure in the first chamber 22 by a predetermined value or more, the passage 28 is opened, and a damping force is generated at that time. When the piston rod 21 moves to the extension side on which the protrusion amount from the inner tube 2 and the outer tube 3 is increased, the disk valve 27a moves in a direction in which the piston 25 shortens the first chamber 22. As a result, when the pressure in the first chamber 22 becomes higher than the pressure in the second chamber 23 by a predetermined value or more, the passage 27 is opened, and a damping force is generated at that time.

In the base valve 13 shown in FIG. 2, a passage 28 and a passage 29 penetrating the base valve 13 in the axial direction are formed. The passages 28 and 29 allow communication between the second chamber 23 and the reservoir chamber R. The base valve 13 is provided with an annular disk valve 30 capable of closing the passage 28 by coming into contact with the base valve 13 on a side of the bottom portion 8 in the axial direction thereof. The base valve 13 is provided with an annular disk valve 31 capable of closing the passage 29 by coming into contact with the base valve 13, on a side opposite to the bottom portion 8 in the axial direction.

The disk valve 30 is a check valve that allows the flow of the working liquid through the passage 28 from the second chamber 23 to a side of the reservoir chamber R and regulates the flow of the working liquid through the passage 28 in a direction opposite to the above flow. The disk valve 30 is a damping valve that opens the passage 28 when the piston rod 21 moves to the contraction side and the pressure in the second chamber 23 becomes higher than the pressure in the reservoir chamber R by a predetermined value or more, and generates a damping force at that time.

The disk valve 31 is a check valve that allows the flow of the working liquid through the passage 29 from the reservoir chamber R toward a side of the second chamber 23 and regulates the flow of the working liquid through the passage 29 in a direction opposite to the above flow. When the piston rod 21 moves to the extension side and the piston 25 moves to a side of the first chamber 22, the pressure in the second chamber 23 drops below the pressure in the reservoir chamber R, and the disk valve 31 opens the passage 29. The disk valve 31 is a suction valve that allows the working liquid to flow from the reservoir chamber R into the second chamber 23 without substantially generating a damping force at that time.

As shown in FIG. 2, a tubular attachment eye 33 is fixed to the outside of the bottom portion 8 of the outer tube 3. In the cylinder device 1, a portion of the piston rod 21 outside the oil seal 15 and the attachment eye 33 are attached between relative moving portions to be attached. In the cylinder device 1, the piston 25 integrated with the piston rod 21 slides axially in the inner tube 2 due to the relative movement generated in the portion to be attached to change the volumes of the first chamber 22 and the second chamber 23. At that time, a damping force is generated due to the flow resistance of an oil liquid generated in the piston 25 and the base valve 13. In the cylinder device 1, for example, the piston rod 21 is connected to the vehicle body side of the vehicle and the attachment eye 33 is connected to the wheel side of the vehicle to generate a damping force with respect to the relative movement of the wheels with respect to the vehicle body.

As shown in FIG. 4, the rod guide 11 has a substantially stepped annular shape. The rod guide 11 has a large diameter portion 11a having a cylindrical outer peripheral surface formed on one side in the axial direction, and a small diameter portion 11b having a cylindrical outer peripheral surface having a smaller diameter than the outer peripheral surface of the large diameter portion 11a formed on the other side in the axial direction. The large diameter portion 11a and the small diameter portion 11b are formed coaxially. The rod guide 11 is fitted to an inner peripheral surface of the outer tube 3 in the large diameter portion 11a and is fitted to an inner peripheral surface of the inner tube 2 in the small diameter portion 11b.

An annular convex portion 11c protruding in the axial direction is formed at an end portion of the rod guide 11 on a side of the large diameter portion 11a in the axial direction. A communication hole 11d that penetrates the rod guide 11 in the axial direction is formed at a radial inner position of the annular convex portion 11c. In the communication hole 11d, a side opposite to the annular convex portion 11c in the axial direction of the rod guide 11 is open to the reservoir chamber R between the outer tube 3 and the inner tube 2.

The oil seal 15 has a seal member main body 37 of an integrally molded product in which a metal annular member

36 is embedded in a synthetic rubber seal material 35 and a metal annular spring 38. The annular member 36 is a member for maintaining the shape of the seal material 35 and gives strength to the seal member main body 37 for fixing it to the target portion. The seal member main body 37 is supported on one end side of the cylinder with the position of the annular member 36 in the radial direction interposed between the annular convex portion 11c of the rod guide 11 and the locking portion 16 of the outer tube 3.

The seal material 35 has a dust lip portion 35a, an oil lip portion 35b, a seal ring portion 35c, and a check lip portion 35d.

The dust lip portion 35a extends in a cylindrical shape from an inner peripheral surface side of the annular member 36 to one side in the axial direction. The oil lip portion 35b extends in a cylindrical shape from the inner peripheral surface side of the annular member 36 to the other side in the axial direction. The seal member main body 37 causes the large diameter portion 21a of the piston rod 21 to be slidably inserted inside the oil lip portion 35b and the dust lip portion 35a. The dust lip portion 35a and the oil lip portion 35b seal a gap between themselves and the large diameter portion 21a of the piston rod 21.

The seal ring portion 35c protrudes in an annular shape from an outer peripheral surface side of the annular member 36 to the same side as the oil lip portion 35b in the axial direction. The seal ring portion 35c is in contact with the annular convex portion 11c of the rod guide 11 and the outer tube 3 at the same time and seals a gap between the outer tube 3 and the rod guide 11.

The check lip portion 35d protrudes in a circular tubular shape from a radial intermediate position of the annular member 36 to the same side as the oil lip portion 35b in the axial direction. The check lip portion 35d is in contact with the annular convex portion 11c of the rod guide 11 at an inner side thereof in the radial direction. The check lip portion 35d functions as a check valve that allows the working fluid leaking from a gap between the rod guide 11 and the large diameter portion 21a of the piston rod 21 to flow to the reservoir chamber R through the communication hole 11d and regulates the flow of the working fluid in a direction opposite to the above flow.

The spring 38 is attached to an outer peripheral portion of the oil lip portion 35b. The spring 38 presses the oil lip portion 35b on an outer periphery of the large diameter portion 21a of the piston rod 21 to seal the gap.

In the cylinder device 1 when the vehicle is traveling, the piston rod 21 or the outer tube 3 repeatedly receives an impact from the outside. Each time an impact force is received, the piston rod 21 moves to the contraction side or the extension side, and a damping force acts at that time. In this way, the cylinder device 1 functions as a shock absorber used in a strut type suspension of an automobile.

Further, since the chrome-plated layer is provided on the outer peripheral surface of the large diameter portion 21a of the piston rod 21 to form the sliding surface, even if the large diameter portion 21a repeatedly slides on the seal member, the chrome-plated layer can exhibit excellent sliding characteristics and can exhibit excellent wear resistance.

In the sliding surface A of the piston rod 21 of the present embodiment, as characteristic evaluation parameters of a plateau structure surface described in JIS B 0671-2 and ISO 13565-2, a reduced peak height Rpk is 0 μm or more and 0.04 μm or less, a core roughness depth Rk is 0.08 μm or more and 0.16 μm or less, and a reduced valley depth Rvk is 0.06 μm or more and less than a plating thickness.

FIG. 1 shows an example of the roughness curve of the sliding surface A of the piston rod 21 polished to have the reduced valley depth Rvk, the reduced peak height Rpk, and the core roughness depth Rk in these ranges.

Since the reduced valley depth Rvk is 0.06 μm or more and less than the plating thickness of the chrome-plated layer, a sufficient amount of oil can be retained in the valley. Therefore, since the oil retention property is excellent, the piston rod 21 can be smoothly slid. In particular, in a case where the piston rod 21 repeatedly reciprocates and slides from a stopped state, the familiarity from the dry state to the steady state becomes suitable in the sliding surface A of the piston rod 21. Therefore, in a case where the piston rod 21 is used for a suspension device for automobile, it is possible to provide a suspension device (a cylinder device) 1 that does not deteriorate the riding comfort of the automobile.

Further, the sliding surface A has a suitable reduced valley depth, a suitable reduced peak height, and a suitable core roughness depth. Therefore, in the piston rod 21, it is possible to have the excellent wear resistance, it is possible to lower the aggression against the oil seal 15, it is possible to reduce the wear of the oil seal 15, and it is possible to reduce the change in the sliding characteristics with time. "Method of Manufacturing Piston Rod"

FIG. 6 is a flowchart showing an outline of a method of manufacturing the piston rod 21.

In an introduction step S1, a rod material such as a steel rod made of a steel material of a type suitable for the piston rod is prepared.

In a heat treatment step S2, the rod material is subjected to heat treatment such as high frequency quenching and tempering and is subjected to surface hardening treatment necessary for a piston rod.

Next, a cutting step S3 and a grinding step S4 are performed to have the outer shape of the piston rod 21 shown in FIG. 3. As a result, the outer shape of the piston rod 21 including the small diameter portion 21*b*, the annular groove 21*c*, the bolt portion 21*d*, and the like is obtained.

Subsequently, in a plating step S5, the piston rod is subjected to chrome plating treatment to form a chrome-plated layer having a film thickness of about 20 μm and is used as a rod material.

Subsequently, in a polishing step S6, the rod material is subjected to outer diameter polishing which will be described below to obtain the target piston rod 21.

FIG. 7 shows the details of the polishing step S6.

The polishing step S6 includes a first polishing step S61, a second polishing step S62, a third polishing step S63, and a fourth polishing step S64. The first polishing step S61 and the second polishing step S62 can be collectively referred to as a polishing step S6-1 for forming an oil reservoir. The third polishing step S63 and the fourth polishing step S64 can be referred to as a polishing step S6-2 for forming a plateau surface.

The polishing step S6-1 for forming an oil reservoir is divided into two steps, a first polishing step S61 and a second polishing step S62, but the present invention is not limited to this, and the polishing may be performed in one step or three or more steps.

The polishing step S6-2 for forming a plateau surface is divided into two steps, a third polishing step S63 and a fourth polishing step S64, but the present invention is not limited to this, and the polishing may be performed in one step or three or more steps.

Figure 8:
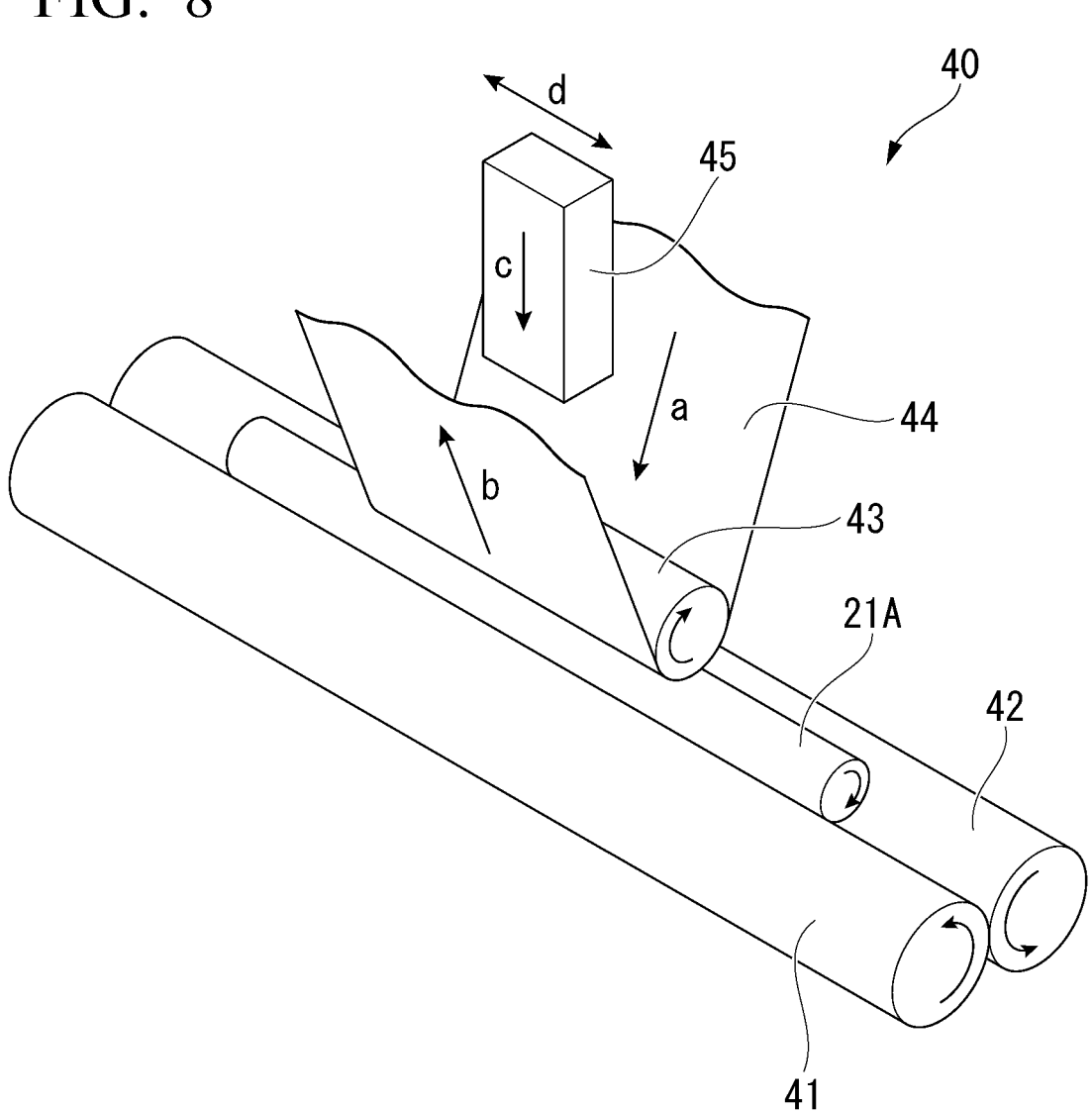
FIG. 8 is a perspective view showing an example of a polishing device used for the outer diameter polishing of the piston rod and shows a main part of the polishing device.

FIG. 8 shows a main part configuration of a film polishing device suitable for carrying out each of the above-mentioned polishing steps.

A polishing device 40 of the present embodiment has drive rollers 41 and 42 in which parts of respective peripheral surfaces are disposed close to each other to be individually horizontal and to be individually rotatable around an axis. Then, it is configured such that the rod material 21A for the piston rod to be processed can be placed on a boundary portion between the drive rollers 41 and 42 disposed close to each other.

When the rod material 21A is disposed on the boundary portion between the drive rollers 41 and 42 disposed close to each other, the supported rod material 21A can be rotated around an axis according to the rotation of the drive rollers 41 and 42.

A backup roller 43 that is rotatable around an axis is horizontally disposed on the rod material 21A above the boundary between the drive rollers 41 and 42. A polishing film 44 can be supplied to a bottom surface side of the backup roller 43 from a film supply device (not shown).

The polishing film 44 is a long rectangular film, and the polishing film 44 is supplied the film supply device (not shown) provided on one side in a direction orthogonal to a central axis of the backup roller 43 toward the bottom surface side of the backup roller 43 as shown by an arrow a. Then, the polishing film 44 is moved to a film winding device (not shown) provided on the other side in the direction orthogonal to the central axis of the backup roller 43 as shown by an arrow b and is wound by the film winding device. According to the polishing device 40, it is possible to continuously supply the polishing film 44 to the bottom surface side of the backup roller 43 in a state where the polishing film 44 is wound around the film supply device for a required length.

The backup roller 43 is rotatably supported while maintaining a horizontal state by a vertical movement mechanism (not shown). The backup roller 43 is supported by the vertical movement mechanism such that its vertical position can be finely adjusted. Above the backup roller 43, a pressing head 45 supported by a vertical and forward-backward movement mechanism (not shown) is provided. The pressing head 45 can press the backup roller 43 downward with a predetermined pressing force while descending from slightly above the backup roller 43 as shown by an arrow c. Further, the pressing head 45 is movably supported also in the axial direction of the backup roller 43 as shown by an arrow d by the above-mentioned vertical and forward-backward movement mechanism. Therefore, the pressing head 45 is supported to be reciprocally movable in the axial direction of the backup roller 43 while the backup roller 43 is pressed downward with a predetermined force.

In the following description, an example of performing the outer diameter polishing of the piston rod 21 using a polishing apparatus equipped with four polishing devices 40 shown in FIG. 8 will be described.

As an example, a polishing film having a count (#600) is loaded as a polishing film of a first polishing device among the four polishing devices. Further, a polishing film having a count (#320) is loaded as a polishing film of a second polishing device. Further, a polishing film having a count (#1000) is loaded as a polishing film of a third polishing device. Further, a polishing film having a count (#2000) is loaded as a polishing film of a fourth polishing device.

The polishing film is a film in which polishing abrasive grains are fixed on one surface of a wrapping film made of a synthetic resin such as a polyethylene resin (PET) with an adhesive layer, and the polishing abrasive grains whose particle size is specified according to the count are fixed on the film.

Among the above-mentioned four polishing devices, the first polishing device can perform the first polishing step S61, the second polishing device can perform the second polishing step S62, the third polishing device can perform the third polishing step S63, and the fourth polishing device can perform the fourth polishing step S64.

Figure 9:
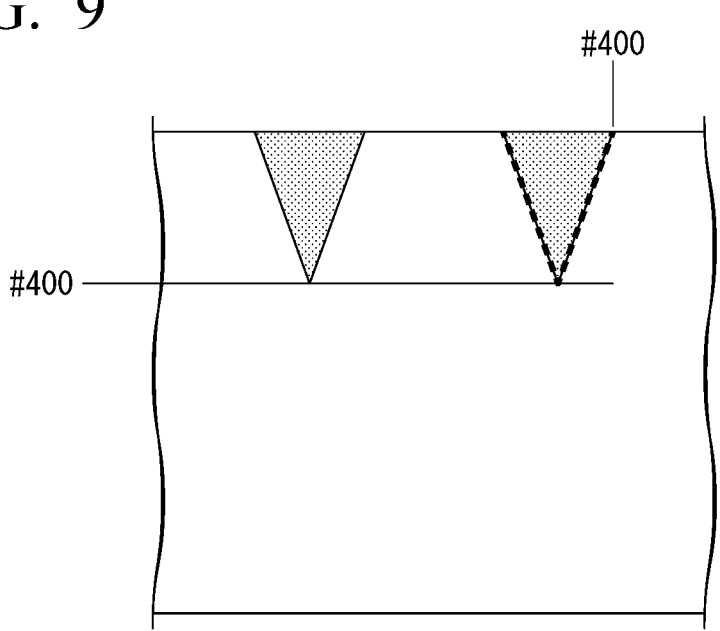
FIG. 9 is a partially enlarged cross-sectional view of a portion including the sliding surface of the piston rod in a cross section including the central axis CL and a view in a case where the outer diameter of the piston rod is polished with a polishing film of #400.
Figure 10:
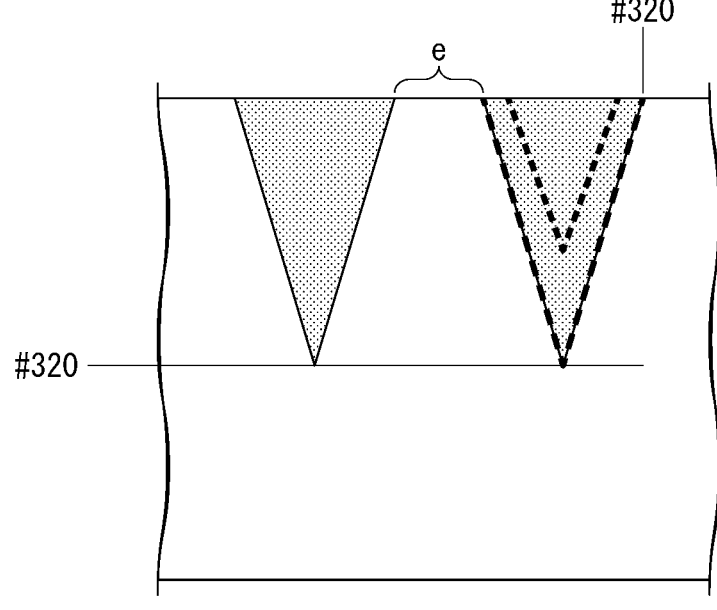
FIG. 10 is a partially enlarged cross-sectional view of a portion including the sliding surface of the piston rod in a cross section including the central axis CL and shows a case where the outer diameter of the piston rod is polished with a polishing film of #320.

When the polishing is performed using a polishing film (a first polishing film) having a lower count in the first polishing step S61 and the second polishing step S62, a groove having a large valley depth and a large valley width can be formed on the surface of the piston rod in these steps. FIG. 9 shows an outline of a groove formed when the polishing is performed with a #400 polishing film. FIG. 10 shows an outline of a groove formed when the polishing is performed with a #320 polishing film.

As is clear by comparing the groove shown in FIG. 9 with the groove shown in FIG. 10, in a case where a polishing film having a low (small) count value is used, the valley width is widened and the valley depth is deepened. At the same time, since the width of a top portion of the peak existing between the valleys becomes small, a true contact area e in a case where the piston rod comes into contact with the oil seal becomes small.

The polishing is performed using a polishing film (a second polishing film) having a higher count in the third polishing step S63 and the fourth polishing step S64. In these polishing steps, with respect to the groove having a large valley width and a large valley depth formed in the first polishing step and the second polishing step and the peak formed between the grooves, polishing to reduce the height of the peak without changing the depth of the valley is performed.

Figure 11:
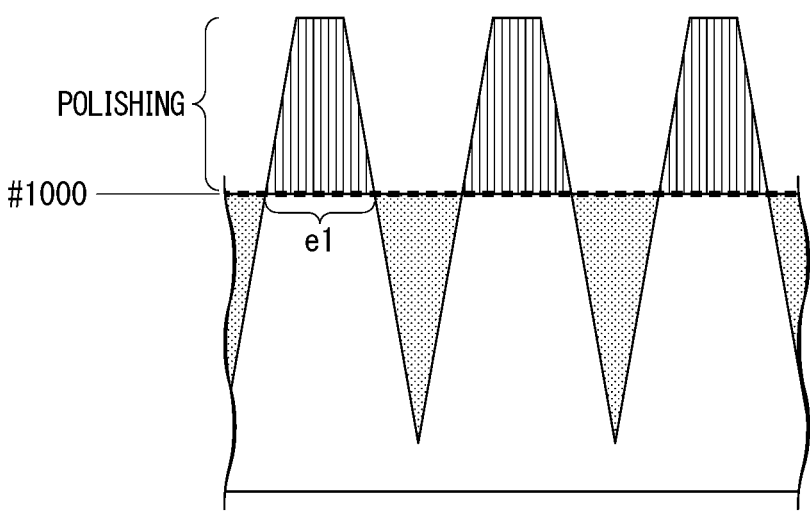
FIG. 11 is a partially enlarged cross-sectional view of a portion including the sliding surface of the piston rod in a cross section including the central axis CL and shows a case where the outer diameter of the piston rod is polished with a polishing film of #1000.

FIG. 11 shows an outline of valleys and peaks generated in a case where the valleys and peaks formed in the first polishing step S61 and the second polishing step S62 are polished using a #1000 polishing film.

Figure 12:
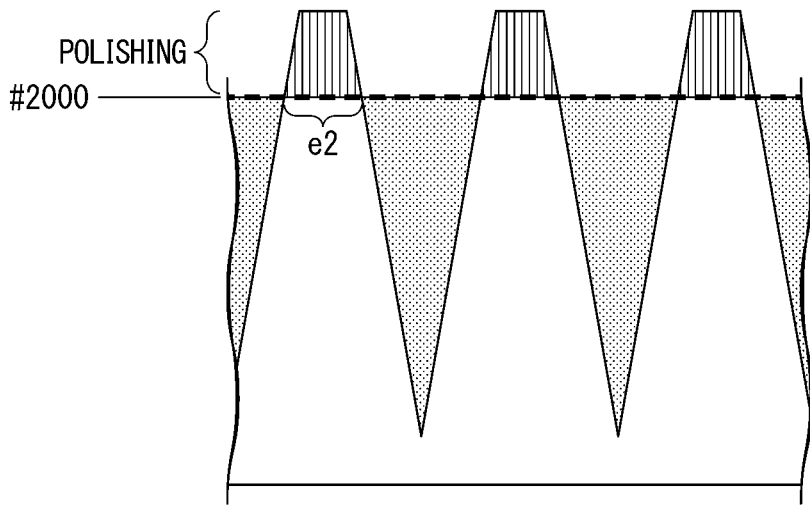
FIG. 12 is a partially enlarged cross-sectional view of a portion including the sliding surface of the piston rod in a cross section including the central axis CL and shows a case where the outer diameter of the piston rod is polished with a polishing film of #2000.

FIG. 12 shows an outline of valleys and peaks generated in a case where the valleys and peaks formed in the first polishing step S61 and the second polishing step S62 are polished using a #2000 polishing film.

In FIG. 11, the peaks of a portion indicated by "polishing" are removed, whereas in FIG. 12, the peaks of a portion indicated by "polishing" are removed.

As can be seen from the comparison between the shape of the valleys and peaks shown in FIG. 11 and the shape of the valleys and peaks shown in FIG. 12, even in the third and fourth polishing steps in which the valleys and peaks formed in the first polishing step S61 and the second polishing step S62 are polished using a polishing film having a count number higher (larger) than those in the first and second polishing steps, the shape of the valleys and peaks formed in a case where the count number is low (#1000) and the shape of the valleys and peaks formed in a case where the count number is high (#2000) are different.

When the valleys and peaks after polishing is performed using the #1000 polishing film as shown in FIG. 11 and the valleys and peaks after polishing is performed using the #2000 polishing film as shown in FIG. 12 are compared with each other, the polishing amount of the peaks is large in the #1000 polishing film, and the polishing amount of the peaks is small in the #2000 polishing film. Therefore, the width of the top portion in one peak that affects the true contact area in a case where the piston rod comes into contact with the oil seal is narrower in a peak width e2 in FIG. 12 than in a peak width e1 in FIG. 11.

Therefore, the true contact area of the outer surface of the piston rod after polishing is performed using the #1000 polishing film becomes larger than the true contact area of the outer surface of the piston rod after polishing is performed using the #2000 polishing film. Further, as is clear by comparing FIGS. 11 and 12, the depth of the valley forming the oil reservoir on the outer surface of the piston rod after polishing is performed using the #2000 polishing film becomes deeper than the depth of the valley forming the oil reservoir on the outer surface of the piston rod after polishing is performed using the #1000 polishing film.

On the basis of the above relationship, it is possible to adjust the true contact area of the piston rod and the depth of the valley which is the oil reservoir by appropriately adjusting the count of the polishing film in the third polishing step S63 and the fourth polishing step S64 in which polishing is performed using the polishing film having a higher count number after polishing is performed using the polishing film having a low count number in the first polishing process S61 and the second polishing process S62. As a result, it is considered that it is possible to reduce the change in the sliding characteristics of the piston rod with time and it is possible to improve the familiarity from the dry state to the steady state when the piston rod slides.

In consideration of the various states of the peaks and valleys after the polishing shown in FIGS. 9 to 12 are taken into consideration, from test results which will be described later, it was found that the surface of the sliding range A (the sliding surface A which is the surface of chrome-plated layer) of the large diameter portion 21a of the piston rod 21 is desirably a polished surface in which, as characteristic evaluation parameters of a plateau structure surface described in JIS B 0671-2 and ISO 13565-2, a reduced peak height Rpk is 0 $\mu$m or more and 0.04 $\mu$m or less (0 to 0.04 $\mu$m), a core roughness depth Rk is 0.08 $\mu$m or more and 0.16 $\mu$m or less (0.08 to 0.16 $\mu$m), and a reduced valley depth Rvk is 0.06 $\mu$m or more and less than a plating thickness.

As described above, in a case where the thickness of the chrome-plated layer is 20 $\mu$m, the reduced valley depth Rvk is 0.06 $\mu$m or more and less than 20 $\mu$m.

"(Rvk), (Rpk), (Rk)"

Hereinafter, the reduced valley depth (Rvk), the reduced peak height (Rpk), and the core roughness depth (Rk) which are used as evaluation parameters in the present embodiment will be described.

In the present embodiment, the smoothed roughness curve of the sliding surface A is obtained from a measured cross-sectional curve. The smoothed roughness curve is represented by measured raw data (the cross-sectional curve) from which a waviness curve is removed by a wavelength filter.

As a cutoff value $\lambda$c used in the present embodiment, $\lambda$c=0.8 mm was used.

Regarding the smoothed roughness curve, the above-mentioned axial cross-sectional curve data is filtered by a phase compensation filter to calculate a first average line, and a lower portion is removed from the first average line. Further, after the lower portion is removed, the axial cross-sectional curve is filtered by the same phase compensation filter to calculate a second average line, and the second average line is subtracted from the cross-sectional curve to obtain the smoothed roughness curve.

Figure 13:
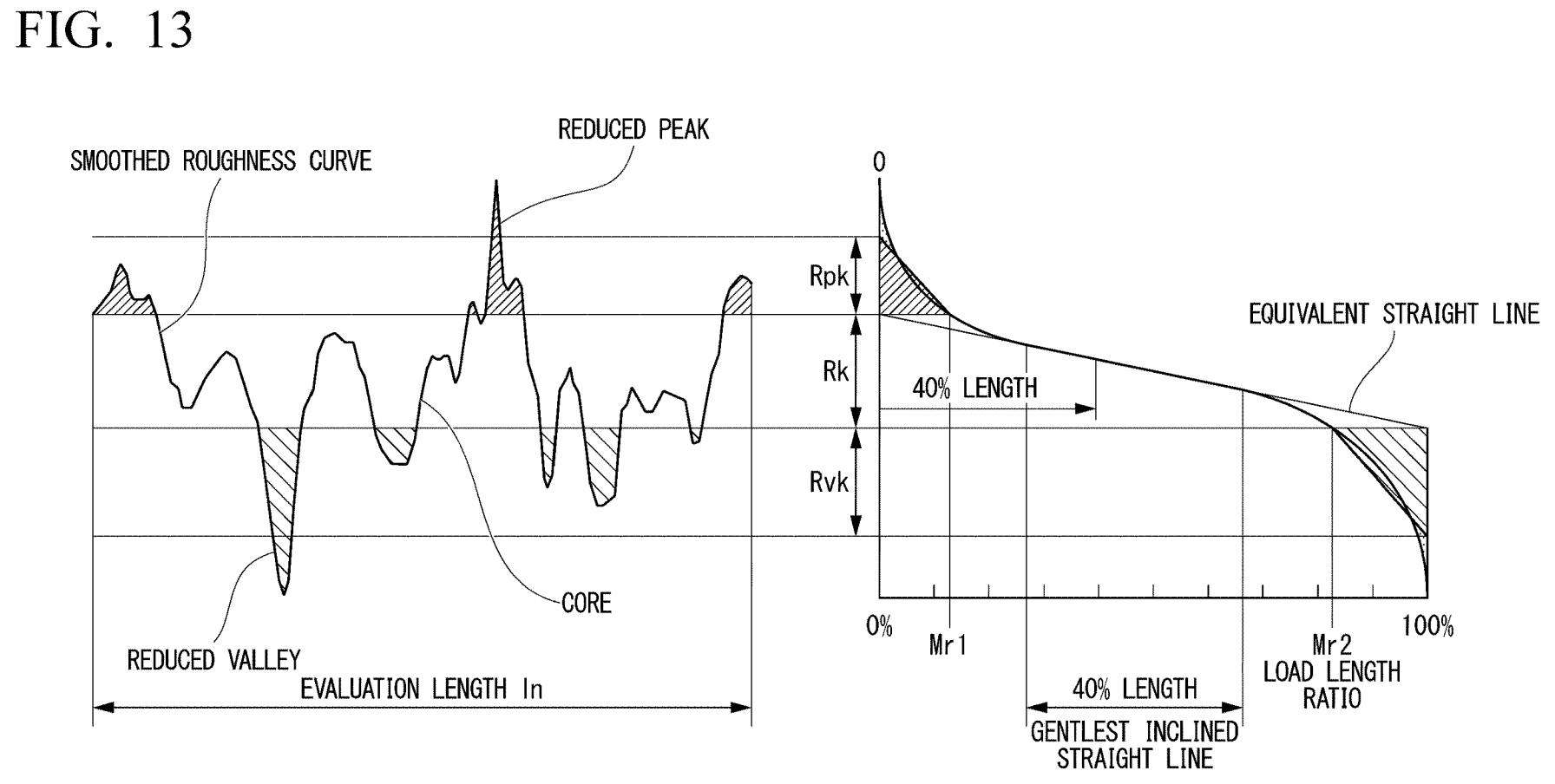

FIG. 13 shows a relationship between the reduced peak, the reduced valley, the core, and an evaluation length ln with respect to the smoothed roughness curve. Further, in FIG. 13, a relationship between a load length ratio, a load curve corresponding to the smoothed roughness curve, an equivalent straight line, the reduced peak height (Rpk), the core roughness depth (Rk), the reduced valley depth (Rvk), and the gentlest inclined straight line is shown. In FIG. 13, Mr1 shows a load length ratio (a percent unit) at a point where a straight line separating the reduced peak and the core of the roughness curve intersects the load curve. Further, Mr2 shows a load length ratio (a percent unit) at a point where a straight line separating the reduced valley and the core of the roughness curve intersects the load curve.

These relationships can be obtained by the procedures shown in FIGS. 14 to 18.

Figure 14:
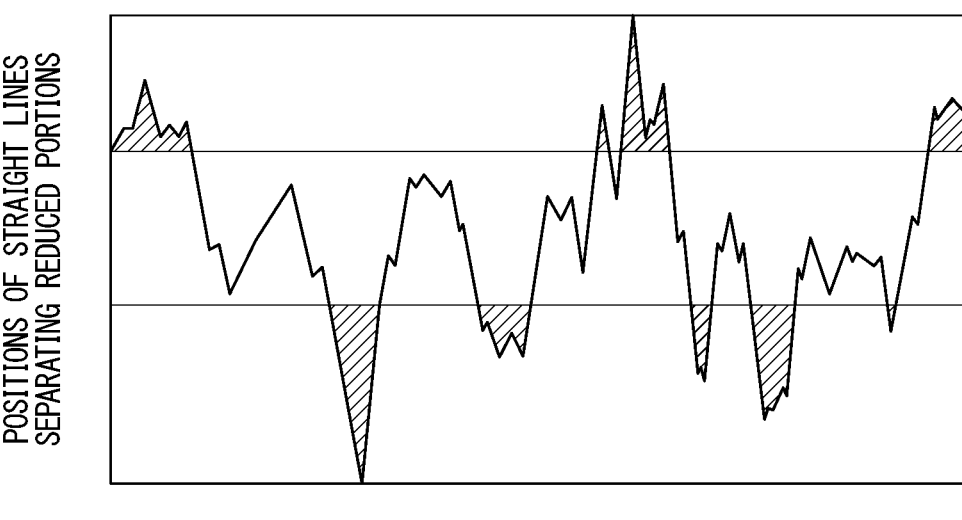
FIG. 14 is an explanatory diagram in a case of obtaining the reduced peak height (Rpk), the core roughness depth (Rk), and the reduced valley depth (Rvk), and an explanatory diagram showing positions of straight lines separating reduced portions in the surface roughness curve.

FIG. 14 shows the smoothed roughness curve obtained as described above.

Figure 15:
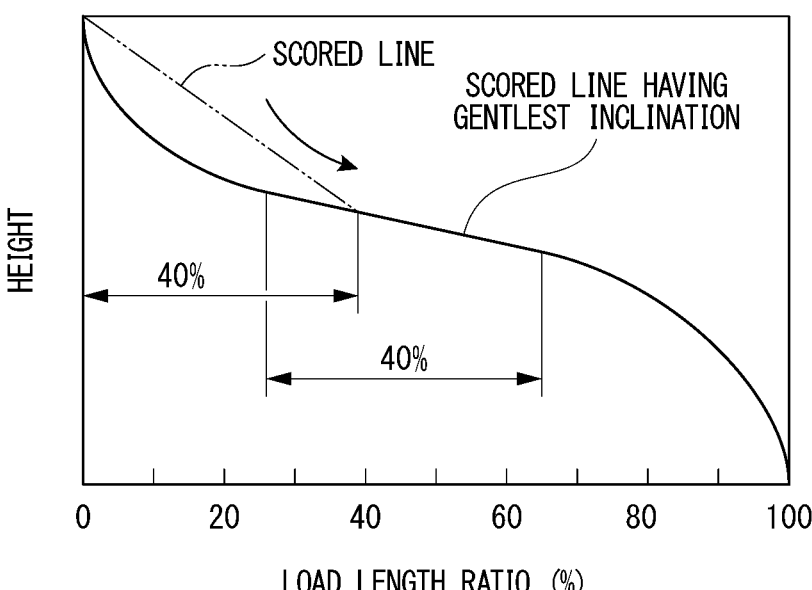
FIG. 15 is an explanatory diagram showing a ratio of a load length of a contour curve element to an evaluation length obtained from the surface roughness curve.

FIG. 15 shows a state in which a ratio of a load length of a contour curve element at a cutting level c to the evaluation length ln is obtained.

Figure 16:
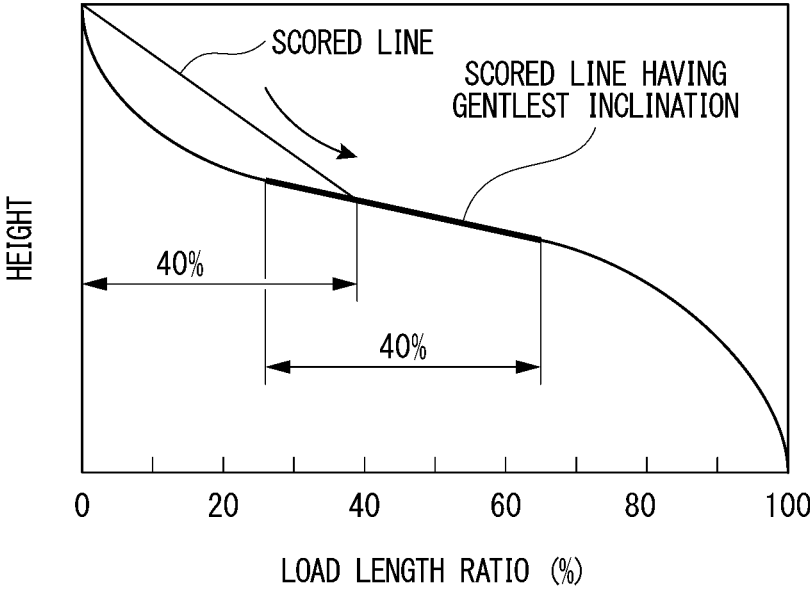
FIG. 16 is an explanatory diagram showing a position of a straight line having the gentlest inclination of a scored line of a load curve drawn with $\Delta$Mr, which is a difference in a load length ratio, as 40%.

As shown in FIG. 16, a position where a scored line of a load curve drawn by setting a difference ΔMr in the load length ratio to 40% has the gentlest inclination is obtained.

Figure 17:
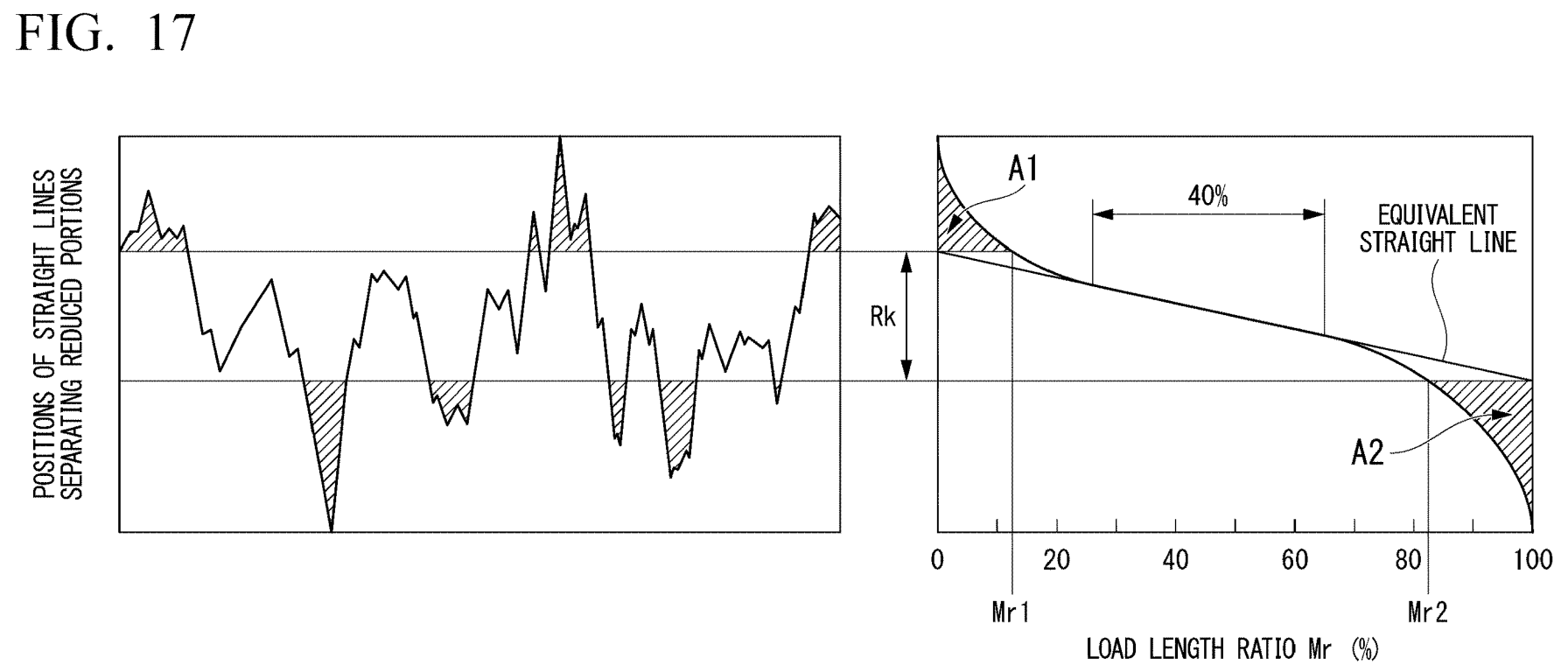

As shown in FIG. 17, the original smoothed roughness curve is divided into the reduced peak and the reduced valley by extending the scored line to Mr=0% and Mr=100%.

Figure 18:
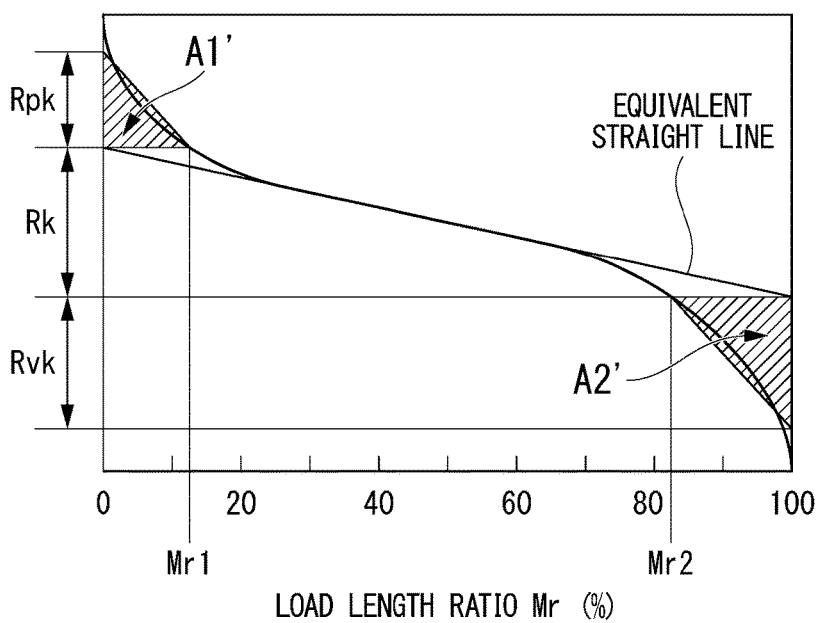
FIG. 18 is an explanatory diagram showing a state in which a height of a right triangle equal to a cross-sectional area A1' of the reduced peak is obtained.

As shown in FIG. 18, a height of a right triangle equal to a cross-sectional area A1' of the reduced peak is obtained, and Mr1 is used as a base.

Here, the load curve is created by totaling the widths of the reduced peaks while moving a cutting line of the smoothed roughness curve corresponding to the evaluation length from an upper end to a lower end in the obtained smoothed roughness curve. When an equivalent straight line of 40% length is drawn in this load curve, an intersection between the equivalent straight line and a vertical axis of 0% is defined as an upper level of the core, and an intersection between the equivalent straight line and a vertical line of 100% is defined as a lower level of the core. A difference between an upper limit level of the core and a lower limit level of the core is defined as the core roughness depth Rk.

Then, an area (an equivalent triangle area A1') generated when an area surrounded by an apex and the upper level of the core in the load curve is caused to be equivalent to a triangle is obtained, and a height of the equivalent triangle is defined as the reduced peak height Rpk. Further, an area (an equivalent triangle area A2') generated when an area surrounded by the vertical line of 100% and the lower level of the core in the load curve is caused to be equivalent to a triangle is obtained, and a height of the equivalent triangle is defined as the reduced valley depth Rvk.

The sliding surface A of the piston rod 21 of the present embodiment is a polished surface in which as defined as described above, a reduced peak height Rpk is 0 μm or more and 0.04 μm or less (0 to 0.04 μm), a core roughness depth Rk is 0.08 μm or more and 0.16 μm or less (0.08 to 0.16 μm), and a reduced valley depth Rvk is 0.06 μm or more and less than a plating thickness.

It is known from the test results, which will be described later, that when the reduced valley depth Rvk is less than 0.06 μm, a frictional force change amount and a frictional force increase, and thus, the reduced valley depth Rvk is desirably 0.06 μm or more.

It is known from the test results, which will be described later, that when the core roughness depth Rk is less than 0.08 μm, a frictional force change amount and a frictional force increase, and thus, the core roughness depth Rk is desirably 0.08 μm or more.

It is known from the test results, which will be described later, that when the reduced peak height Rpk is more than 0.04 μm, a peeling amount of the oil seal increases, and thus, the reduced peak height Rpk is desirably 0.04 μm or less.

It is known from the test results, which will be described later, that when the core roughness depth Rk is more than 0.16 μm, a peeling amount of the oil seal increases, and thus, the core roughness depth Rk is desirably 0.16 μm or less.

EXAMPLES

Samples 1 to 10 were obtained as a sample of a piston rod obtained by surface hardening treatment (high frequency quenching and tempering), cutting, outer diameter processing, and chrome plating treatment of a steel rod made of JIS S25C (a diameter 12.5 mm, a length 200 mm).

Next, on the basis of FIG. 7, the polishing step S6 was carried out according to the first to fourth polishing steps S61 to 64 described above. In carrying out the polishing step S6, the polishing device 40 having the drive rollers 41 and 42, the backup roller 43, a polishing film 44, and the pressing head 45 shown in FIG. 8 was used.

A rotation speed of the drive roller 41 during polishing was 1400 rpm, and a pressing force by the pressing head 45 was 0.15 to 0.3 MPa. Further, in the first polishing step S61 and the second polishing step S62, any of the polishing films having the particle size 1, the particle size 2, and the particle size 3 shown in the order in FIG. 27 was used. Further, in the third polishing step S63 and the fourth polishing step S64, polishing processing was carried out using any of the polishing films having the particle size 4, the particle size 5, and the particle size 6 shown in FIG. 27.

In the first polishing step S61 and the second polishing step S62, groove formation that is effective mainly for holding a lubricating oil was performed. In the third polishing step S63 and the fourth polishing step S64, polishing processing for forming a plateau surface was performed.

For the samples 1 to 10, as characteristic evaluation parameters of a plateau structure surface specified in JIS B 0671-2 (2002) and ISO 13565-2 described above, the reduced valley depth Rvk, the reduced peak height Rpk, and the core roughness depth Rk were obtained. An average value of those measurement results is shown in FIG. 28.

In the samples 1 to 10, roughness measurement was performed by measuring the sliding surface A at five points in the axial direction using a stylus type surface roughness tester. Here, the conditions were such that evaluation length: 4 mm, and cutoff (λc): 0.8 mm.

For each sample, the maximum frictional force at each frequency was measured and the change in the frictional force with time was evaluated using a fine amplitude vibrator.

The measurement of the frictional force was performed in the conditions that the frequency was set to 0.2, 0.5, 1, 2, 5, 10, 15, 20, 30, 40 Hz, the measurement region was set to the piston rod intermediate length±1 mm, and the piston speed was set to 0.002 to 0.290 m/s. In the test example which will be described later, the maximum frictional force difference (P-P) was a difference (peak to peak) between the maximum frictional force on the extension side and the maximum frictional force on the contraction side of the suspension at each frequency. Further, the frictional force change amount was a difference (P-P) between the initial value of the test and the maximum frictional force after 3 cycles.

Figure 19:
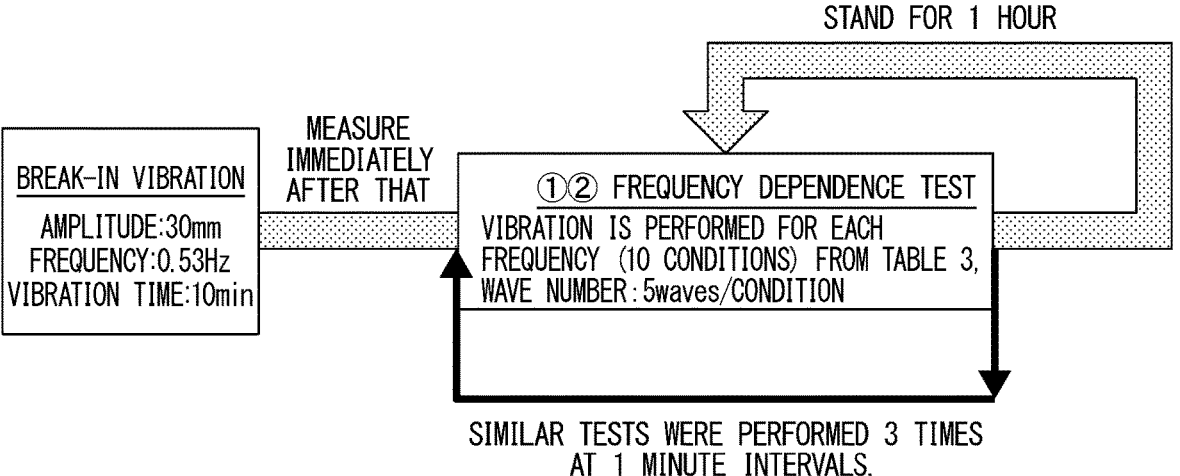
FIG. 19 is an explanatory diagram of a reproduction test method performed on an example sample.

As for the details of the frequency dependence test conditions, as shown in FIG. 19, a break-in vibration (amplitude: 30 mm, frequency: 0.53 Hz, vibration time: 10 minutes) was performed, and then a vibration was performed at the frequency shown in FIG. 29 (10 conditions). Similar tests were performed 3 times at 1 minute intervals.

Then, after each sample is allowed to stand for 1 hour, the vibration was performed again under the conditions shown in FIG. 29, and the same tests were repeated 3 times at 1 minute intervals to perform a reproduction test.

Figure 20:
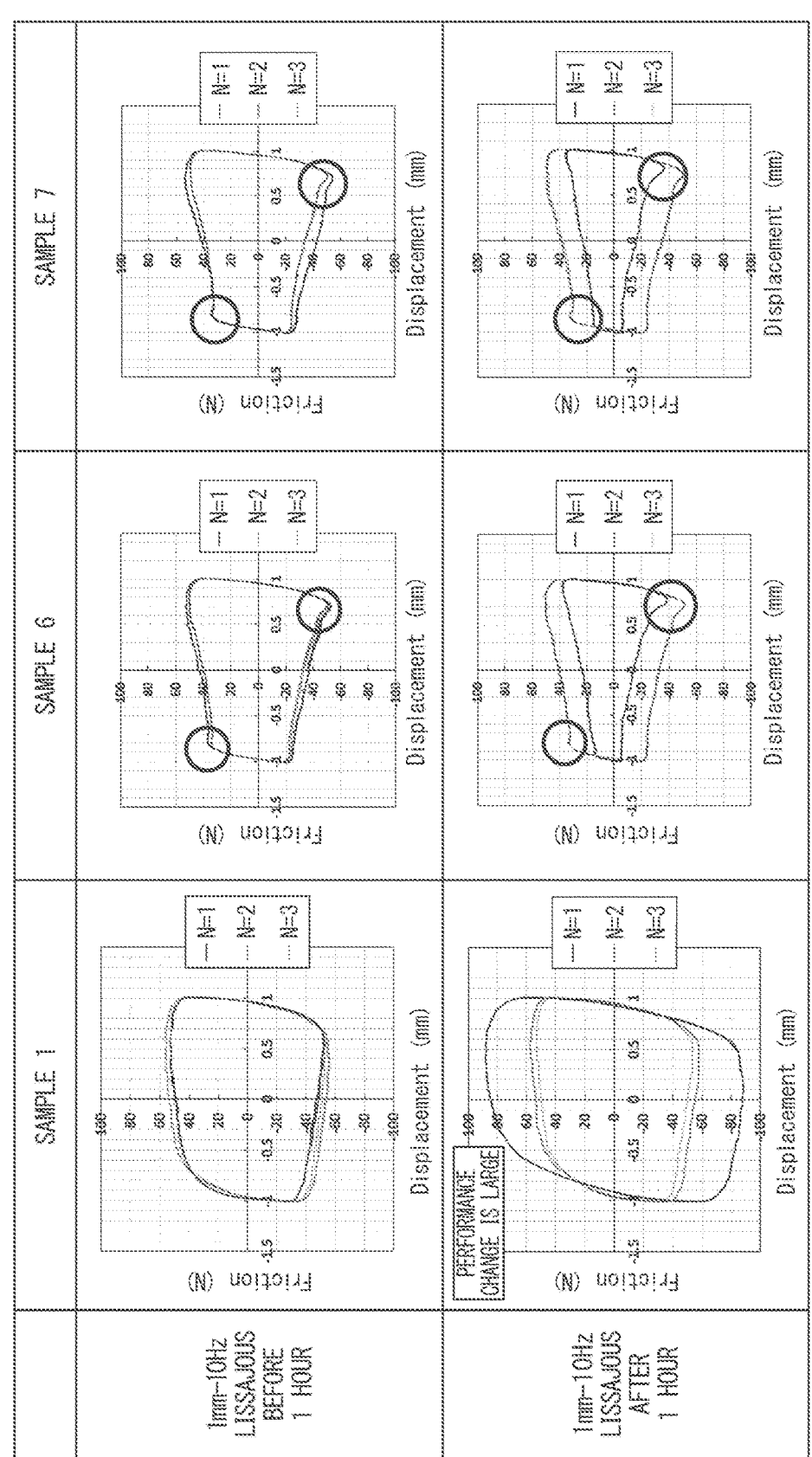
FIG. 20 is a graph showing evaluation test results of an example in a case where test conditions in the outer diameter polishing (a polishing step S6 of FIG. 6) are changed and obtained.

FIG. 20 shows Lissajous waveforms of the samples 1, 6, and 7 of the samples 1 to 10 shown in FIG. 28 in a case where the test condition is 1 mm-10 Hz of the test conditions shown in FIG. 29.

As shown by the measurement results shown in FIG. 20, when the Lissajous waveforms before and after 1 hour are compared, in the sample 1, the friction value shown on the vertical axis greatly fluctuates in the three measurements.

On the other hand, in the sample 6 and the sample 7, the fluctuation of friction shown on the vertical axis is small, and good results are obtained.

The value of the core roughness depth Rk in the sample 6 was 0.06 μm. The value of the core roughness depth Rk in the sample 7 was 0.15 μm which is larger than 0.06 μm.

Therefore, it was found that the value of the reduced valley depth Rvk is important in each sample.

Figure 21:
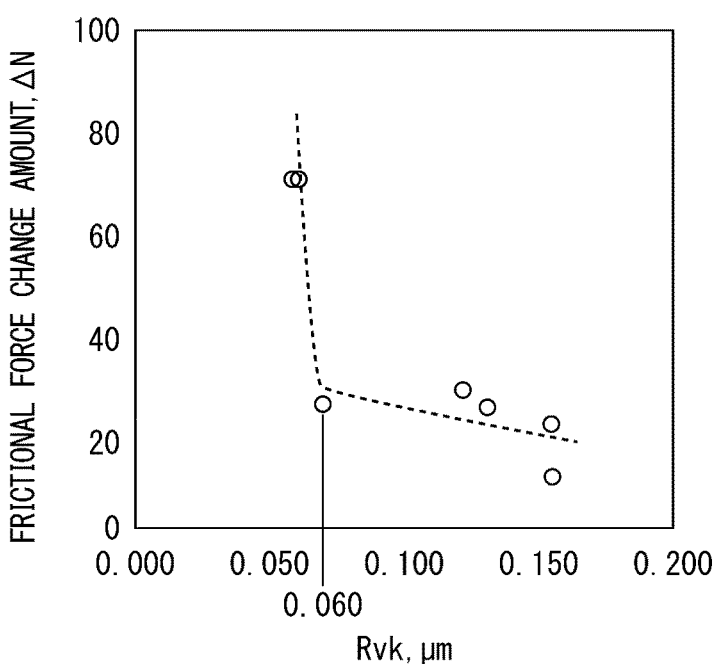
FIG. 21 is a graph showing a relationship between the reduced valley depth (Rvk) and a frictional force change amount ($\Delta$N) in a plurality of piston rods manufactured in the example.

Therefore, with respect to the samples 1 to 7 of the samples 1 to 10 shown in FIG. 28, the result of the obtained relationship between the reduced valley depth Rvk and the frictional force change amount ΔN is shown in FIG. 21.

The frictional force change amount ΔN was defined as the difference (P-P) between the initial value of the test and the maximum frictional force after 3 cycles.

Figure 22:
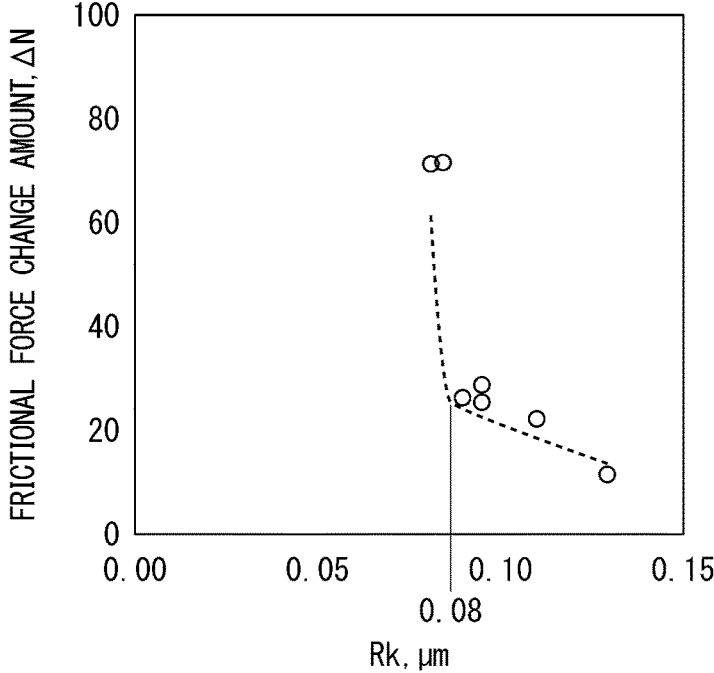
FIG. 22 is a graph showing a relationship between the core roughness depth (Rk) and a frictional force change amount ($\Delta$N) in a plurality of piston rods manufactured in the example.

Next, with respect to the samples 1 to 7 that represent the result shown in FIG. 21, the result of the obtained relationship between the core roughness depth Rk and the frictional force change amount ΔN is shown in FIG. 22.

From the result shown in FIG. 21, it was found that the reduced valley depth Rvk needs to be 0.06 μm or more to reduce the friction force change amount.

From the result shown in FIG. 22, it was found that the core roughness depth Rk needs to be 0.08 μm or more to reduce the friction force change amount.

Figure 23:
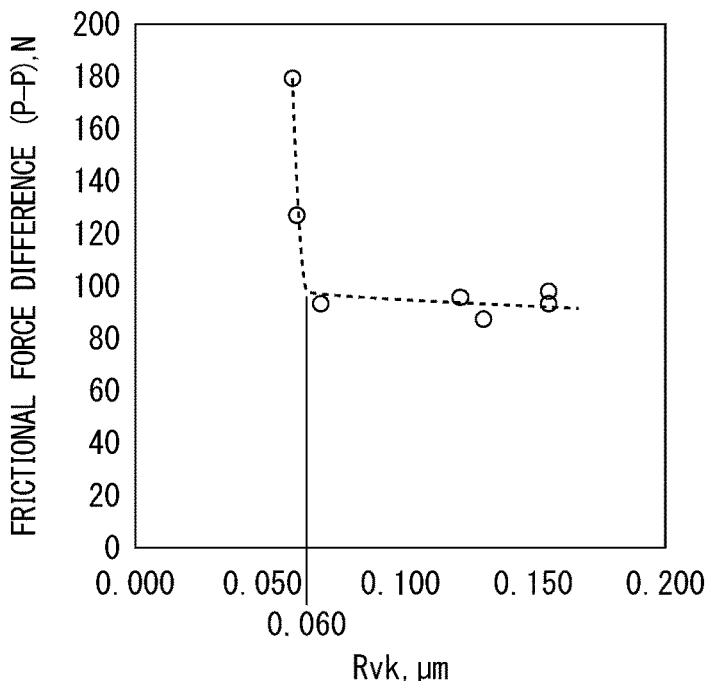
FIG. 23 is a graph showing a relationship between the reduced valley depth (Rvk) and the maximum frictional force difference (P-P) in a plurality of piston rods manufactured in the example.

Next, with respect to the samples prepared under the same conditions as the samples 1 to 7 that represent the result shown in FIG. 21, the result of the obtained relationship between the reduced valley depth Rvk and the maximum frictional force difference (P-P) is shown in FIG. 23. The maximum frictional force difference (P-P) is a difference (peak to peak) between the maximum frictional force on the extension side and the maximum frictional force on the contraction side of the suspension at each frequency.

Figure 24:
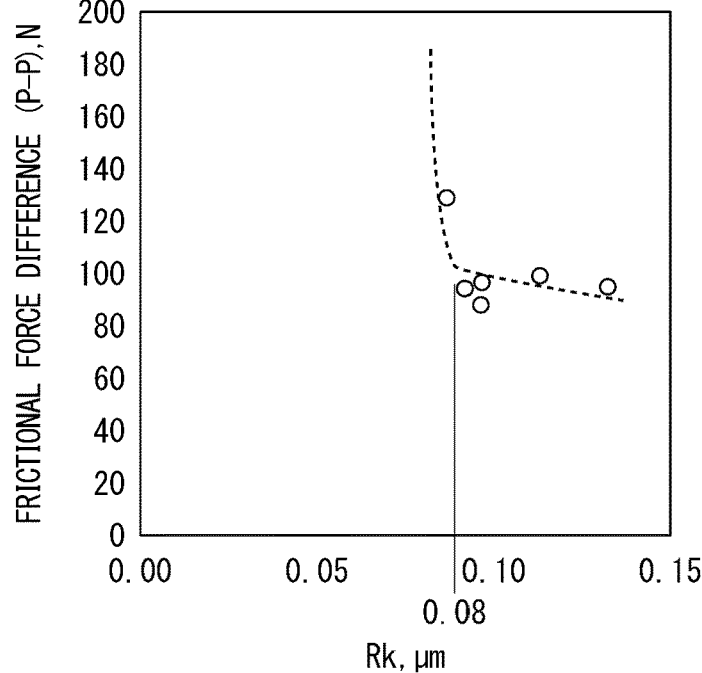
FIG. 24 is a graph showing a relationship between the core roughness depth (Rk) and the maximum frictional force difference (P-P) in a plurality of piston rods manufactured in the example.

Further, with respect to the same samples as described above, the result of the obtained relationship between the core roughness depth Rk and the maximum frictional force difference (P-P) is shown in FIG. 24.

From the result shown in FIG. 23, it was found that the reduced valley depth Rvk needs to be 0.06 μm or more to reduce the maximum frictional force difference (P-P).

From the result shown in FIG. 24, it was found that the core roughness depth Rk needs to be 0.08 μm or more to reduce the maximum frictional force difference (P-P).

From the above results, by making the core roughness depth Rk to 0.08 μm or more and the reduced valley depth Rvk to 0.06 μm or more, it is possible to form an appropriate oil groove on the sliding surface of the piston rod. Therefore, it was found that due to the sliding surface outside the oil seal of the piston rod, it is possible to quickly recover the dry state to the wet (steady) state, and it is possible to improve the familiarity between the oil and the piston rod.

Next, with respect to the samples prepared under the same conditions as the samples 1 to 10 that represent the result shown in FIG. 21 described above, as an accelerated test, each of the samples was assembled to the cylinder device (the shock absorber) having the structure shown in FIGS. 2 to 5 in an oilless state. Then, the amount of seal wear was evaluated using a fine amplitude vibrator with an amplitude of ±1 mm, a frequency of 15 Hz, a rod intermediate length in the measuring region of ±1 mm, and a test cycle of 2700 times.

The amount of seal wear was evaluated by observing the attachment amount of the oil seal attached to the surface of the piston rod after the test with a laser microscope.

Figure 25:
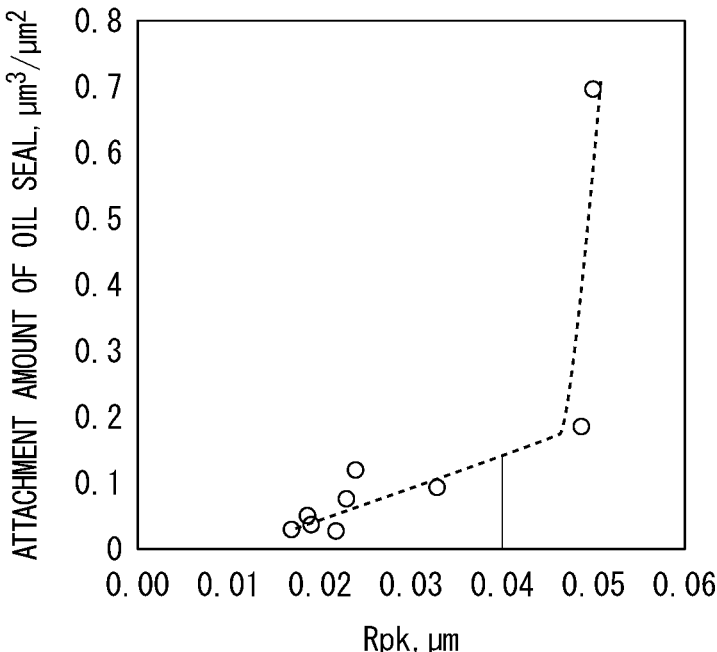
FIG. 25 is a graph showing a relationship between the reduced peak height (Rpk) and an oil seal adhesion amount in a plurality of piston rods manufactured in the example.
Figure 26:
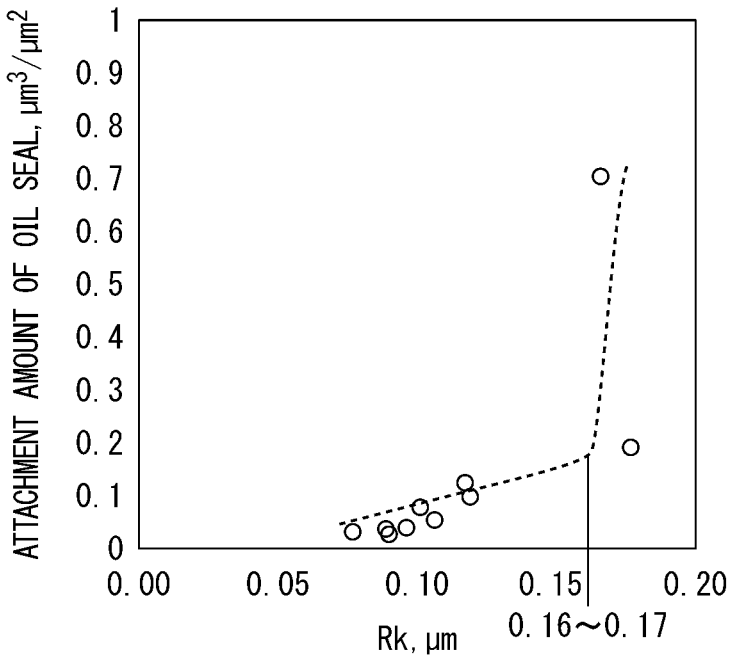
FIG. 26 is a graph showing a relationship between the core roughness depth (Rk) and an oil seal adhesion amount in a plurality of piston rods manufactured in the example.

FIG. 25 shows the relationship between the attachment amount of the oil seal and the reduced peak height Rpk. FIG. 26 shows the relationship between the attachment amount of the oil seal and the core roughness depth Rk.

From the relationship shown in FIG. 25, it was found that a large difference in the attachment amount of the oil seal is generated with the value of the reduced peak height Rpk of 0.04 μm as a boundary. From the relationship shown in FIG. 26, it was found that a large difference in the attachment amount of the oil seal is generated with the value of the core roughness depth Rk of 0.16 μm as a boundary.

Therefore, it was found that by making the reduced peak height Rpk to 0.04 μm or less and the core roughness depth Rk to 0.16 μm or less, it is possible to reduce the aggression against the oil seal, and it is possible to improve the wear resistance. Further, with the results shown in FIGS. 25 and 26 summarized, it is understood that by making the reduced peak height Rpk to 0.02 μm or more and 0.04 μm or less, it is possible to surely obtain a piston rod having excellent sliding characteristics.

The outline of one aspect of the present invention based on the above description will be summarized below.

(1) A cylinder device of the present aspect includes: a cylinder having a bottomed tubular shape; a seal member provided at an opening of the cylinder; and a piston rod that is provided to protrude from the opening of the cylinder and slides with respect to the seal member.

Further, a sliding surface of the piston rod has a chrome-plated layer. Furthermore, in the sliding surface, as characteristic evaluation parameters of a plateau structure surface described in JIS B 0671-2 and ISO 13565-2, a reduced valley depth Rvk is 0.06 μm or more and less than a plating thickness, a reduced peak height Rpk is 0 μm or more and 0.04 μm or less, and a core roughness depth Rk is 0.08 μm or more and 0.16 μm or less.

(2) A method of manufacturing a piston rod of the present aspect is a method of manufacturing a piston rod in which a chrome-plated layer is formed on a sliding surface, the method includes: a polishing step performed after the formation of the chrome-plated layer.

Further, the polishing step includes an initial polishing step of polishing with a first polishing film to obtain an initial polished surface in which as a characteristic evaluation parameter of a plateau structure surface described in JIS B 0671-2 and ISO 13565-2, a reduced valley depth Rvk is 0.06 μm or more and less than a plating thickness of the chrome plating; and a finish polishing step of polishing the initial polished surface with a second polishing film having a finer mesh than the first polishing film to form a plateau surface in which as lubricity parameters of the plateau structure surface, a reduced peak height Rpk is 0 μm or more and 0.04 μm or less, and a core roughness depth Rk is 0.08 μm or more and 0.16 μm or less.

(3) In the method of manufacturing a piston rod according to (2), the following is also possible: in the initial polishing step, the initial polished surface is formed with a polishing material having a coarse particle size of #600 or less as the first polishing film; and in the finish polishing step, the plateau surface is formed with a polishing material having a fine particle size of #800 or more as the second polishing film. As the first polishing film, a polishing material having a particle size of #120 or more and #600 or less may be used. Further, as the second polishing film, a polishing material having a particle size of #800 or more and #3000 or less may be used.

INDUSTRIAL APPLICABILITY

According to each of the above aspects of the present invention, the sliding surface of the piston rod has a suitable reduced valley depth, a suitable reduced peak height, and a suitable core roughness depth. Therefore, it is possible to have the excellent wear resistance, it is possible to lower the aggression against the oil seal, it is possible to reduce the wear of the oil seal, and it is possible to reduce the change in the sliding characteristics with time. Further, the familiarity from the dry state to the steady state is suitable, and thus, in a case where the present invention is applied to a piston rod for an automobile suspension device, it is possible to provide a suspension device which does not deteriorate the riding comfort of an automobile. Therefore, the industrial applicability is great.

REFERENCE SIGNS LIST

1 Cylinder device (shock absorber)
2 Inner tube
3 Outer tube
11 Rod guide
15 Oil seal (seal member)
21 Piston rod
21a Large diameter portion
25 Piston
A Sliding surface

The invention claimed is:

1. An automobile suspension device comprising:
a cylinder having a bottomed tubular shape in which a working fluid is sealed;
an oil seal provided at an opening of the cylinder; and
a piston rod that is provided to protrude from the opening of the cylinder, configured to slide in an axial direction while contacting with the oil seal, and formed with a sliding surface configured to repeatedly move in and out between an inside and an outside of the cylinder;
wherein the sliding surface of the piston rod includes a chrome-plated layer,
wherein, the sliding surface is formed with grooves including, as characteristic evaluation parameters of a plateau structure surface described in JIS B 0671-2 (2002) and ISO 13565-2 (1996) in effect on the filing date of this application,
a reduced valley depth Rvk is 0.06 μm or more and less than a plating thickness,
a reduced peak height Rpk is 0 μm or more and 0.04 μm or less, and
a core roughness depth Rk is 0.08 μm or more and 0.16 μm or less, and
wherein the grooves are configured to be filled with and hold the working fluid by the moving in and out of the piston rod between the inside and the outside of the cylinder.

2. The automobile suspension device according to claim 1, wherein the reduced valley depth Rvk is 0.06 μm or more and 0.15 μm or less,
the reduced peak height Rpk is 0.02 μm or more and 0.04 μm or less, and
the core roughness depth Rk is 0.08 μm or more and 0.13 μm or less.

3. The automobile suspension device according to claim 1, wherein
the core roughness depth Rk is larger than the reduced peak height Rpk.

4. The automobile suspension device according to claim 2, wherein
a film thickness of the chrome-plated layer is 20 μm, and
the reduced valley depth Rvk is large than an upper value of the reduced peak height Rpk.

5. The automobile suspension device according to claim 1, wherein
the reduced valley depth Rvk is obtained by polishing processes with two different types of a first polishing film and a second polishing film, and
the reduced peak height Rpk and the core roughness depth Rk are obtained by polishing process with a third polishing film having a finer mesh than the first polishing film and the second polishing film.

6. The automobile suspension device according to claim 1, further comprising:
an outer cylinder provided on an outer side of the cylinder so as to be coaxially with the cylinder;
a piston which is provided on a tip end side of the piston rod to slide along the inside of the cylinder, divides the inside of the cylinder into a first chamber and a second chamber, and includes a disk valve formed with a passage allowing a flow of the working fluid between the first chamber and the second chamber; and
the disk valve formed with a passage allowing the working fluid flowing between one end portion of the cylinder positioned on a tip end side of the piston rod and one end side of the outer cylinder arranged on an outer side of the cylinder,
wherein another end of the cylinder and another end of the outer cylinder are closed by a tubular rod guide provided with the tubular oil seal at an inside of the rod guide, and
wherein a damping force to the piston rod is generated by a movement of the working fluid caused by the piston sliding in the cylinder.

7. A method of manufacturing a piston rod of an automobile suspension device, in which
a chrome-plated layer is formed on a sliding surface which slides in an axial direction while contacting with an oil seal,
the sliding surface is configured to repeatedly move in and out between an inside and an outside of the cylinder, and
the piston rod is configured to move in and out the cylinder accommodating a working fluid therein,
the method comprising a polishing step performed after the chrome-plated layer is formed,
wherein the polishing step includes:
an initial polishing step of polishing with a first polishing film and polishing with a second polishing film having coarser mesh than the first film, to obtain an initial polished surface in which, as a characteristic evaluation parameter of a plateau structure surface described in JIS B 0671-2 (2002) and ISO 13565-2 (1996), a reduced valley depth Rvk is 0.06 μm or more and less than a plating thickness of the chrome plating; and a finish polishing step of polishing the initial polished surface with a third polishing film having a finer mesh than the first polishing film and the second polishing film to form a plateau surface in which, as lubricity parameters of the plateau structure surface, a reduced peak height Rpk is 0 µm or more and 0.04 µm or less, and a core roughness depth Rk is 0.08 µm or more and 0.16 µm or less.

8. The method of manufacturing a piston rod of an automobile suspension device according to claim 7, wherein the reduced valley depth Rvk is 0.06 µm or more and 0.15 µm or less, the reduced peak height Rpk is 0.02 µm or more and 0.04 µm or less, and the core roughness depth Rk is 0.08 µm or more and 0.13 µm or less.

9. The method of manufacturing a piston rod of an automobile suspension device according to claim 7, wherein, in the initial polishing step, the initial polished surface is formed with a polishing material having a coarse particle size of #600 or less as the first polishing film, and wherein, in the finish polishing step, the plateau surface is formed with a polishing material having a fine particle size of #800 or more as the third polishing film.

\* \* \* \* \*